(12) United States Patent
Hanashima et al.

(10) Patent No.: US 7,068,864 B2
(45) Date of Patent: Jun. 27, 2006

(54) WAVEGUIDE-EMBEDDED OPTICAL CIRCUIT AND OPTICAL FUNCTIONAL ELEMENT USED THEREIN

(75) Inventors: Naoki Hanashima, Tokyo (JP); Tohru Kineri, Tokyo (JP); Kenjiro Hata, Tokyo (JP)

(73) Assignee: TDK Corporation, Tokyo (JP)

( * ) Notice: Subject to any disclaimer, the term of this patent is extended or adjusted under 35 U.S.C. 154(b) by 1 day.

(21) Appl. No.: 10/702,136

(22) Filed: Nov. 5, 2003

(65) Prior Publication Data

US 2004/0141677 A1 Jul. 22, 2004

(30) Foreign Application Priority Data

Nov. 5, 2002 (JP) ............................. 2002-321305
Sep. 25, 2003 (JP) ............................. 2003-332640

(51) Int. Cl.
*G02F 1/295* (2006.01)

(52) U.S. Cl. ................ 385/6; 385/4; 385/14; 359/494; 359/495; 359/501; 398/65; 398/68

(58) Field of Classification Search .................... 385/6, 385/14, 27, 28, 43, 129, 4; 359/494, 495, 359/5, 501; 398/65, 68

See application file for complete search history.

(56) References Cited

U.S. PATENT DOCUMENTS

| 4,733,941 | A | * | 3/1988 | Broer et al. .................. 385/127 |
| 5,157,746 | A | | 10/1992 | Tobita et al. .................. 385/33 |
| 6,130,778 | A | * | 10/2000 | Iwatsuka et al. ............. 359/497 |
| 6,363,188 | B1 | * | 3/2002 | Alphonse ....................... 385/37 |
| 6,411,764 | B1 | | 6/2002 | Lee .............................. 385/131 |
| 6,813,417 | B1 | | 11/2004 | Oh et al. ....................... 385/43 |
| 2002/0106159 | A1 | | 8/2002 | Nishimura et al. ............. 385/49 |
| 2002/0141682 | A1 | | 10/2002 | Ryu et al. ...................... 385/14 |
| 2003/0053756 | A1 | | 3/2003 | Lam et al. ..................... 385/49 |
| 2004/0264863 | A1 | | 12/2004 | Suzuki et al. .................. 385/43 |

FOREIGN PATENT DOCUMENTS

| JP | 10-068910 | | 3/1998 | |
| JP | 10-339848 | | 12/1998 | |
| JP | 11-119158 | | 4/1999 | |
| JP | 2002182051 | A * | 6/2002 | ................... 385/49 |

OTHER PUBLICATIONS

Bakke, T. et al., "Vertically Tapered Core Polymeric Optical Spot-Size Transformer," *Electronics Letters* 37(24):1475-1476, Nov. 2001.

Bakke, T. et al., "Polymeric Buried Core Adiabatic Optical Spot-Size Transformer," *Electronics Letters* 38(7):319-321, Mar. 2002.

(Continued)

*Primary Examiner*—Frank G. Font
*Assistant Examiner*—Jerry Martin Blevins
(74) *Attorney, Agent, or Firm*—Seed IP Law Group PLLC

(57) ABSTRACT

The present invention is to provide an arrayed waveguide-embedded optical circuit with reduced loss at a groove and an optical functional element using for the arrayed waveguide-embedded optical circuit.

The arrayed waveguide-embedded optical circuit according to the present invention comprises a waveguide, a groove formed across the waveguide and two or more spot-size transformer pairs whose members face each other across the groove.

4 Claims, 30 Drawing Sheets

OTHER PUBLICATIONS

Mizuno, T. et al., "Low-Loss 1.5%-Delta Arrayed Waveguide Grating with Narrow Laterally Tapered Spotsize Converter," *Electronics Letters* 37(24):1452-1454, Nov. 2001.

Mitomi, O. et al., "Design of a Single-Mode Tapered Waveguide for Low-Loss Chip-to-Fiber Coupling," *IEEE Journal of Quantum Electronics* 30(8):1787-1793, Aug. 1994.

Shani, Y. et al., "Efficient Coupling of a Semiconductor Laser to an Optical Fiber by Means of a Tapered Waveguide on Silicon," *Appl. Phys. Lett.* 55(23):2389-2391, Dec. 1989.

Spühler, M. et al., "A Very Short Planar Silica Spot-Size Converter Using a Nonperiodic Segmented Waveguide," *Journal of Lightwave Technology* 16(9):1680-1685, Sep. 1998.

* cited by examiner

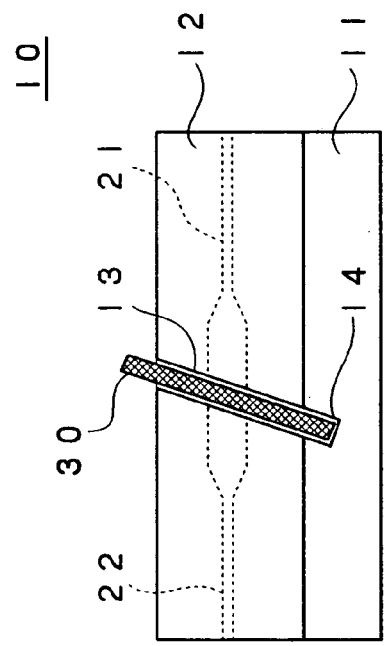
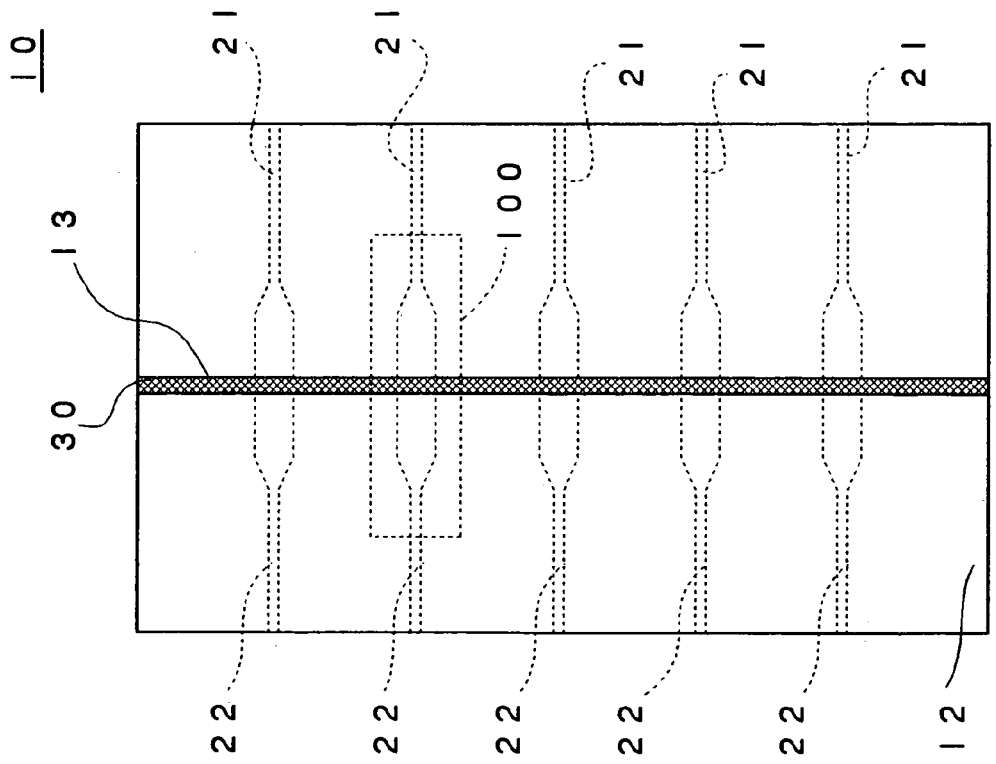

FIG.24(a)  FIG.24(b)
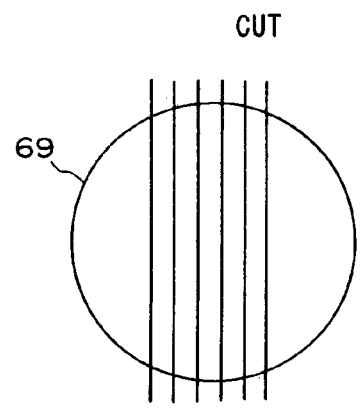
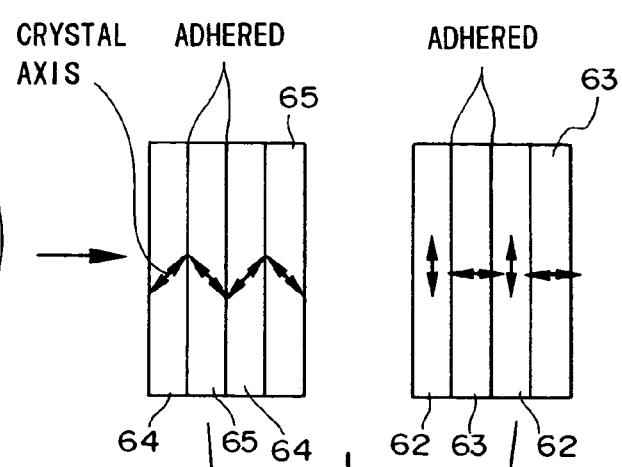
FIG.24(d)  FIG.24(c)
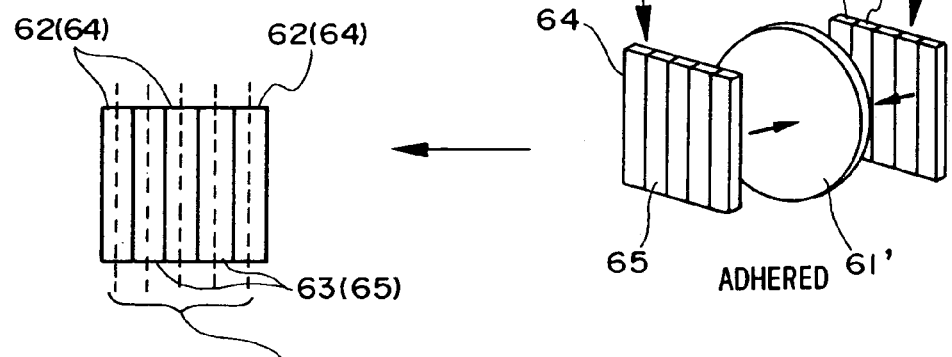
FIG.24(e)
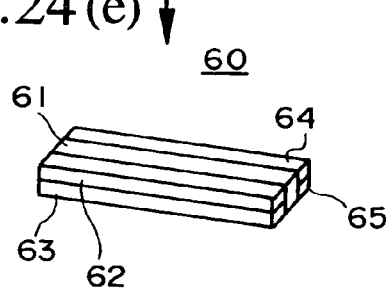

FIG.25(a)
FIG.25(b)
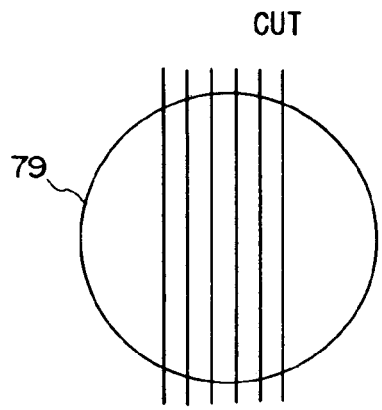
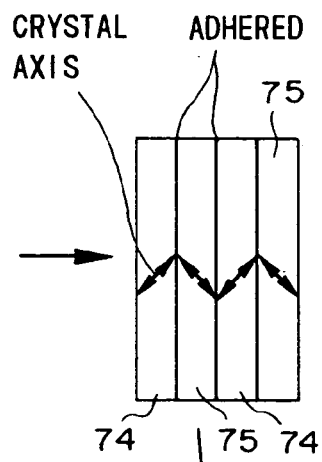
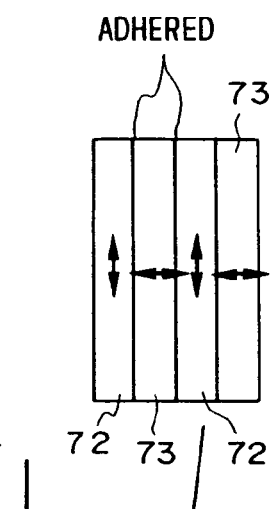
FIG.25(d)   FIG.25(c)
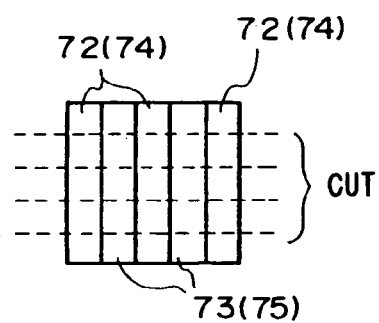
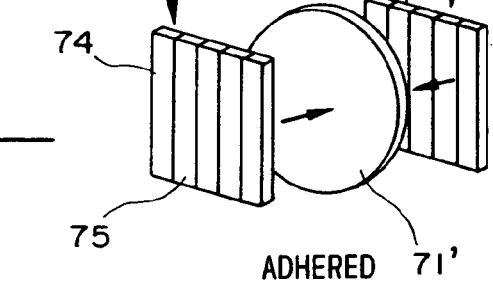
FIG.25(e)
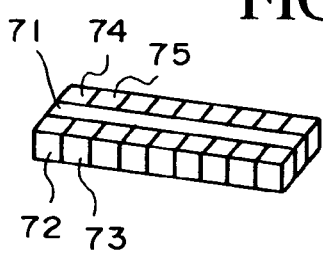

WAVEGUIDE-EMBEDDED OPTICAL CIRCUIT AND OPTICAL FUNCTIONAL ELEMENT USED THEREIN

BACKGROUND OF THE INVENTION

The present invention relates to a waveguide-embedded optical circuit and an optical functional element used this, particularly to an arrayed waveguide-embedded optical circuit comprised of two or more embedded optical waveguides and an optical functional element used therein.

DESCRIPTION OF THE PRIOR ART

In recent years, optical communication is widely utilized to transmit information at high data rate. In optical communications, a non-reciprocal optical functional element, such as an optical isolator element, a circulator or the like is suitably inserted in a predetermined part of an optical waveguide (optical fiber or embedded type optical waveguide) to constitute an optical circuit.

As described in JP10-68910A, a non-reciprocal optical functional element, such as an optical isolator element, a circulator or the like, is generally constituted to have an optical isolator, such as a Faraday rotator or polarizer, positioned between two lenses. However, since a so-configured non-reciprocal optical functional element has many parts, it is difficult to miniaturize, and since it needs high precision alignment of the optical axis, the production cost becomes high. Thus, the optical circuit of the waveguide-embedded type, in which the optical functional element comprising the Faraday rotator, polarizer or the like is directly inserted in a groove provided by separating the optical waveguide without lenses, has attracted attention.

Since a waveguide-embedded optical circuit can miniaturize the overall size, including that of the optical waveguide in which it is inserted, it is also possible to configure an arrayed optical circuit having optical functional elements arranged in parallel on two or more embedded optical waveguides as described in JP11-119158A.

However, when light propagates through the optical waveguide separated by the groove, loss occurs that is caused mainly by diffraction in the separated region. FIG. 1 is a diagram for explaining this loss, and schematically shows the state of light propagating from an optical waveguide 41 consisting of a core 41a and a cladding 41b across a gap to an optical waveguide 42 consisting of a core 42a and a cladding 42b, wherein FIG. 1(a) shows the case of a small core size and FIG. 1(b) shows the case of large core size. As shown in FIG. 1(a) and FIG. 1(b), since the light outputting from the optical waveguide spreads owing to diffraction, diffraction loss increases as the gap "d" becomes larger. On the other hand, as can be seen from a comparison of FIG. 1(a) and FIG. 1(b), since the diffraction becomes very pronounced as the beam-spot 40 becomes smaller, it is necessary to make the gap width narrow and enlarge the diameter of beam spot in order to reduce diffraction loss.

For this reason, when the optical waveguide separated by the groove is an optical fiber, loss resulting from diffraction can be reduced if the spot-size is transformed by using a TEC (Thermally Expanded Core) fiber whose core diameter has been locally expanded at the end. As is well known, the core in a TEC fiber is expanded by heating with a microburner, heater or the like. This is described in, for example, JP10-339848A, "Efficient coupling of a semiconductor laser to an optical fiber by means of a tapered waveguide on silicon" (Appl. Phys. Lett. 55(23), 4 Dec. 1989, pp2389–2391), and "Polymeric buried core adiabatic optical spot-size transformer" (ELECTRONICS LETTERS Vol. 38, No.7, 28th Mar. 2002, pp319–321).

However, since the heat capacity of the waveguide-embedded optical circuit is very large compared with that of an optical fiber, it is difficult to expand the diameter of a core locally by heating in the manner of the TEC fiber. Thus, in the waveguide-embedded optical circuit, there is a problem that the loss owing to the diffraction that arises in the groove in which the non-reciprocal optical functional element is inserted becomes large.

When establishing the groove in the embedded optical waveguide and inserting the optical functional element, such as a Faraday rotator and a polarizer, in the groove directly in this way, big loss occurs in the groove. Therefore, when taking advantage of the possibility of miniaturizing the waveguide-embedded optical circuit in configuring an array optical circuit, there arises a problem of diffraction loss occurring in every channel.

SUMMARY OF THE INVENTION

It is therefore an object of the present invention to provide an arrayed waveguide-embedded optical circuit with reduced loss at a groove.

Another object of the present invention to provide an optical functional element using for an arrayed waveguide-embedded optical circuit.

The above and other objects of the present invention are accomplished by an arrayed waveguide-embedded optical circuit comprising a waveguide, a groove formed across the waveguide, and two or more spot-size transformer pairs whose members face each other across the groove, wherein each spot-size transformer comprises at least a first optical waveguide comprising a first core and a first cladding, and a second optical waveguide comprising a second core as a extension of the first cladding and a second cladding.

According to the present invention, in each facing pair of spot-size transformers, the spot-size of the light inputting to the first optical waveguide of one spot-size transformer is expanded, the light propagates through the second optical waveguide and inputs to the second optical waveguide of the other spot-size transformer facing the one spot-size transformer across the groove, the spot-size of the light is reduced, and the light propagates through the first optical waveguide. Since the spot-size of the light propagating through the groove is expanded, it is possible to significantly reduce the loss owing to diffraction. It is therefore possible to reduce the diffraction loss occurring in each channel and exploit the advantage of the waveguide-embedded optical circuit being capable of miniaturization. Accordingly, it is possible to provide an arrayed waveguide-embedded optical circuit with preferable characteristics.

In a preferred aspect of the present invention each spot-size transformer comprises at least, a first optical waveguide comprising a first core and a first cladding and a second optical waveguide comprising a second core as a extension of the first cladding and a second cladding.

In a preferred aspect of the present invention, each of the spot-size transformers further comprises a transition waveguide positioned between the first optical waveguide and the second optical waveguide and is constituted so that the width of the first core becomes gradually narrower as it goes toward the second optical waveguide. According to this aspect of the present invention, it is possible to transform the spot-size of the light in the transition waveguide.

In a preferred aspect of the present invention, a first cladding substantially covers the whole surface of the first core. Moreover, the center of the first core and the center of the second core are preferably aligned substantially on the same axis. According to this aspect of the present invention, since the center of the beam spot propagating through the first optical waveguide and the center of the beam spot propagating through the second optical waveguide are substantially aligned, it is possible to transform the beam spot-size more efficiently.

In a preferred aspect of the present invention, the groove is formed at an angle to a plane perpendicular to the axis of the light propagating through the spot-size transformer. According to this aspect of the present invention, it is possible to prevent reflective light occurring at the groove from propagating backwards.

In a preferred aspect of the present invention, the arrayed waveguide-embedded optical circuit further comprises an optical isolator element inserted in the groove. According to this aspect of the present invention, it is possible to provide an arrayed optical isolator or an arrayed optical circulator with low loss.

In a preferred aspect of the present invention, the optical isolator element is provided at an angle to a plane perpendicular to the axis of the light propagating through the spot-size transformer. According to this aspect of the present invention, it is possible to prevent reflective light occurring at the surface of a magneto-optic functional element from propagating backwards. Moreover, in the above case of forming the groove at an angle, if the insertion angle of the magneto-optic functional element is set as a predetermined angle defined by the formation angle of the groove, the optical axis gap between the incident light and the transmitted light caused by inclination of the groove can be rectified, and it is possible to reduce loss.

In a preferred aspect of the present invention, the arrayed waveguide-embedded optical circuit further comprises an optical filter inserted in the groove. According to this aspect of the present invention, it is possible to provide an arrayed optical filter with low loss.

The above and other aspects of the present invention can also be accomplished by an optical functional element which can be inserted into a groove of an arrayed waveguide-embedded optical circuit which comprises a waveguide, a groove formed across the waveguide and two or more embedded optical waveguide pairs whose members face each other across the groove, wherein the optical functional element has regions for passing the light propagating through the two or more pairs of the embedded optical waveguides.

According to this aspect of the present invention, since the optical functional element is inserted into the groove formed on the arrayed waveguide-embedded optical circuit, it is possible to impart predetermined optical characteristics to each pair of the embedded optical waveguides and reduce the number of components.

In a preferred aspect of the present invention, the optical functional element comprises a magneto-optic functional element, first and second birefringent plates formed on one surface of the magneto-optic functional element, and third and fourth birefringent plates formed on the other surface of the magneto-optic functional element. According to this aspect of the present invention, it is possible to use the optical functional element as an optical isolator.

In a preferred aspect of the present invention, a boundary between the first and second birefringent plates and a boundary between the third and the fourth birefringent plates coincide substantially with the direction of arrangement of the pairs of embedded optical waveguides when the optical functional element is inserted into the groove. In another preferred aspect of the present invention, the first and second birefringent plates are arranged alternately on one surface of the magneto-optic functional element and the third and fourth birefringent plates are arranged alternately on the other surface of the magneto-optic functional element. In a further preferred aspect of the present invention, the first and second birefringent plates are arranged on one surface of the magneto-optic functional element in a checker pattern and the third and fourth birefringent plates are arranged on the other surface of the magneto-optic functional element in a checker pattern.

In a preferred aspect of the present invention, the first and third birefringent plates are located at positions where, when the optical functional element is inserted into the groove, one half of the beam spot of the light propagating through each pair of embedded optical waveguides is projected and the second and fourth birefringent plates are located at positions where, when the optical functional element is inserted into the groove, the other half of the beam spot of the light propagating through each pair of the embedded optical waveguides is projected. According to this aspect of the present invention, it is possible to constitute an arrayed optical isolator by inserting the optical functional element into the groove on the arrayed waveguide-embedded optical circuit.

In a preferred aspect of the present invention, the first and third birefringent plates are located at positions where, when the optical functional element is inserted into the groove, the beam spot of the light propagating through a predetermined pair of the embedded optical waveguides among the two or more pairs of the embedded optical waveguides is projected and the second and fourth birefringent plates are located at positions where, when the optical functional element is inserted into the groove, the beam spot of the light propagating through another pair of the embedded optical waveguides adjacent to the predetermined pair of the embedded optical waveguide among the two or more pairs of the embedded optical waveguide is projected. According to this aspect of the present invention, it is possible to constitute an arrayed optical circulator by inserting the optical functional element into the groove on the arrayed waveguide-embedded optical circuit.

In a preferred aspect of the present invention, the crystal axes of the first, second, third and fourth birefringent plate are set to +22.5 degrees, −67.5 degrees, −22.5 degrees, +67.5 degrees to a predetermined reference axis, respectively. According to this aspect of the present invention, it is possible to use components in common and achieve high productivity.

In a preferred aspect of the present invention, the optical functional element comprises a magneto-optic functional element, first birefringent plates formed on one surface of the magneto-optic functional element at predetermined intervals, and second birefringent plates formed on the other surface of the magneto-optic functional element at predetermined intervals. In this case, it is preferable for the first and second birefringent plates to be located at positions where they do not substantially face each other across the magneto-optic functional element. According to this aspect of the present invention, it is possible to constitute an arrayed optical circulator by inserting the optical functional element into the groove on the arrayed waveguide-embedded optical circuit.

The above and other aspects of the present invention can also be accomplished by an optical functional element comprising a magneto-optic functional element, first and second birefringent plates formed alternately on one surface of the magneto-optic functional element, and third and fourth birefringent plates formed alternately on the other surface of the magneto-optic functional element. According to this aspect of the present invention, it is possible to constitute an arrayed optical isolator or an arrayed optical circulator by inserting the optical functional element into the groove on the arrayed waveguide-embedded optical circuit.

The above and other aspects of the present invention can also be accomplished by an optical functional element comprising a magneto-optic functional element, first birefringent plates formed on one surface of the magneto-optic functional element at predetermined intervals, and second birefringent plates formed on the other surface of the magneto-optic functional element at predetermined intervals. According to the present invention, it is possible to constitute an arrayed optical circulator by inserting the optical functional element into the groove on the arrayed waveguide-embedded optical circuit.

The above and other aspects of the present invention can also be accomplished by a waveguide-embedded optical circuit comprising a waveguide, a groove formed across the waveguide, two or more embedded optical waveguide pairs whose members face each other across the groove, and an optical functional element which can be inserted into the groove, wherein the optical functional element has regions that pass light propagating through the embedded optical waveguide by way of the groove. According to this aspect of the present invention, the number of components can be reduced because desired optical characteristics can be imparted to two or more embedded optical waveguides using a single optical functional element.

As explained above, according to the present invention, since the members of spot-size transformer pairs face each other across a groove and the spot-size is expanded at the groove, it is possible to significantly reduce the diffraction loss arising when the signal light passes across the groove. It is therefore possible to reduce the diffraction loss occurring in each channel and exploit the advantage of the waveguide-embedded optical circuit being capable of miniaturization. Accordingly, it is possible to provide an arrayed waveguide-embedded optical circuit with preferable characteristics.

BRIEF DESCRIPTION OF THE DRAWINGS

FIGS. 1(a)–1(b) are diagrams for explaining how loss occurs owing to diffraction, wherein FIG. 1(a) shows the case of a small core size and FIG. 1(b) shows the case of a large core size.

FIGS. 2(a)–2(b) are views showing a waveguide-embedded optical circuit 10 (optical isolator element) according to one preferred embodiment of the present invention, wherein FIG. 2(a) is a schematic top view and FIG. 2(b) is a schematic side view.

FIGS. 24(a)–24(e) are charts showing an example of the flow of processes for fabricating the optical isolator element 60 shown in FIG. 20.

FIGS. 25(a)–25(e) are charts showing an example of the flow of processes for fabricating the optical isolator element 70 shown in FIG. 22.

DESCRIPTION OF THE PREFERRED EMBODIMENT

Figure 1A:
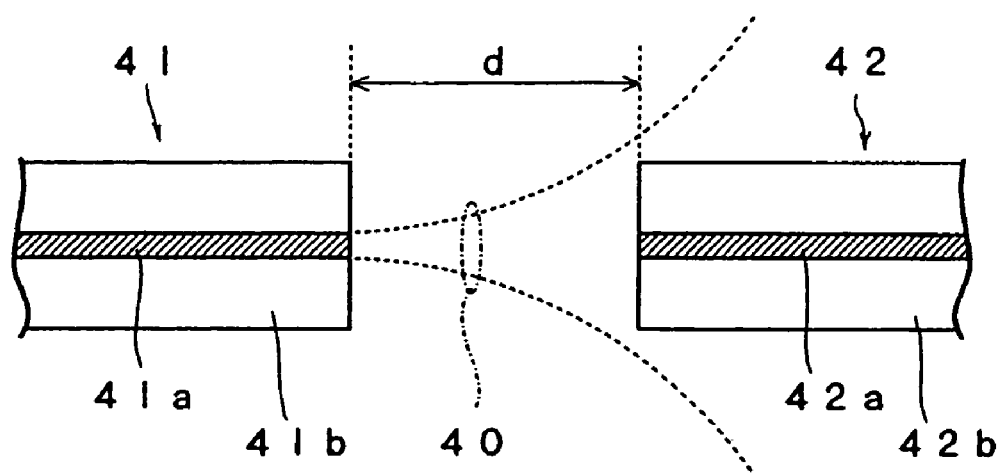
Figure 1B:
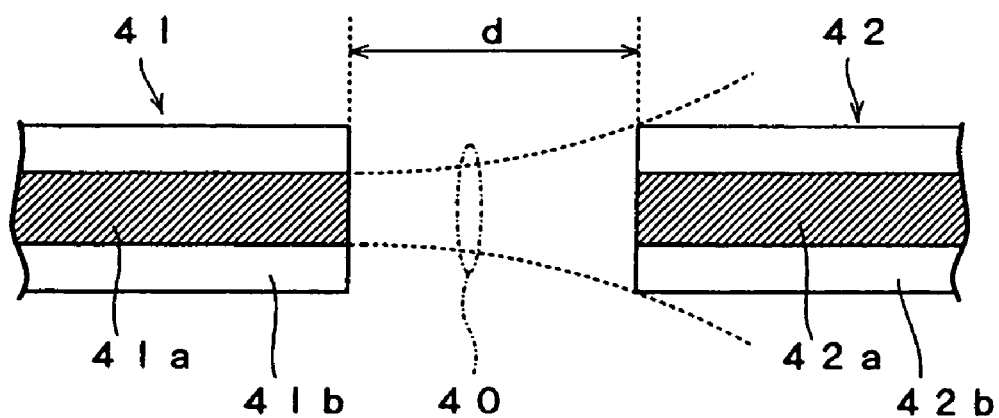

Preferred embodiments of the present invention will now be explained with reference to the drawings.

FIG. 2(a) and FIG. 2(b) are views showing a waveguide-embedded optical circuit 10 that is a preferred embodiment of the present invention. FIG. 2(a) is a schematic top view and FIG. 2(b) is a schematic side view.

As shown in FIGS. 2(a)–2(b), the waveguide-embedded optical circuit 10 of this embodiment comprises a substrate 11, a waveguide 12 formed on the substrate 11 and an optical isolator element 30 inserted in a groove 13 formed in the waveguide 12. The substrate 11 serves to ensure mechanical strength of the waveguide-embedded optical circuit 10. The material of the substrate 10 is not particularly limited insofar as the substrate 10 can ensure the mechanical strength of the waveguide-embedded optical circuit 10 and silicon or glass is preferably used as the material of the substrate 10. The waveguide layer 12, is formed with multiple embedded optical waveguide pairs (five pairs in the illustrated example) each comprising an embedded optical waveguide 21 and an embedded optical waveguide 22, and with an inclined groove 13 that separates the embedded optical waveguides 21, 22. The groove 13 is preferably given the narrowest width capable of accommodating the optical isolator element 30. Moreover, the optical isolator element 30 is fixed in the groove 13 by optical adhesive 14 filled into the groove 13.

Figure 3:
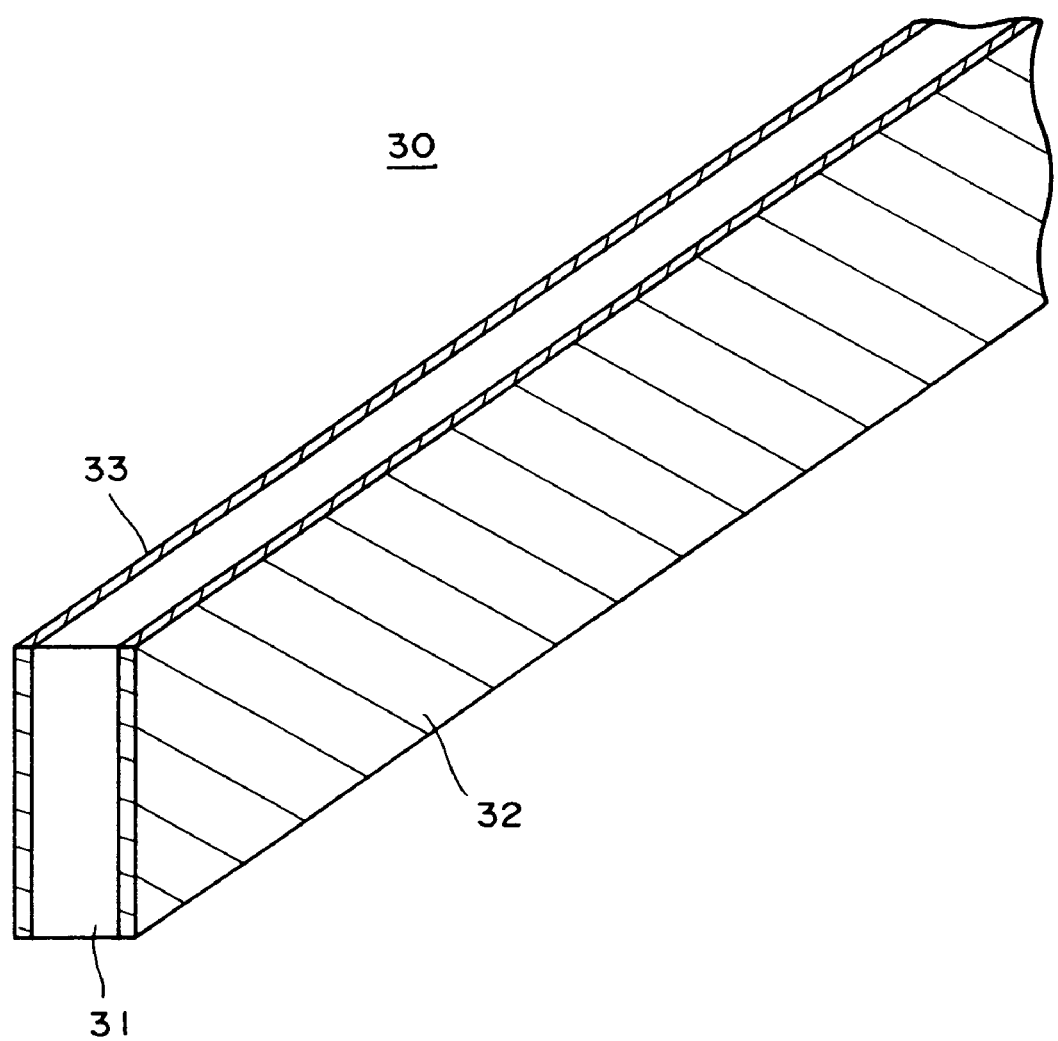
FIG. 3 is a schematic perspective view showing the structure of an optical isolator element 30.

FIG. 3 is a schematic perspective view showing the structure of the optical isolator element 30. As shown in FIG. 3, the optical isolator element 30 is a plate comprised by a Faraday rotator 31 and the polarizers 32, 33 formed on two surfaces facing each other across the Faraday rotator 31. The Faraday rotator 31 serves to rotate the polarization by 45 degrees and may be composed magneto-optic crystals, such as bismuth-substituted rare-earth iron Garnett, although it is not particularly limited to this composition. The thickness of the Faraday rotator 31 changes with the material and the wavelength of the light propagating through the embedded optical waveguides 21, 22. For example, when the Faraday rotator 31 consists of bismuth-substituted rare-earth iron Garnett, it is required to have a thickness of about 250 μm when the wavelength of the light propagating through the embedded optical waveguides 21, 22 is 1.31 μm, and is required to have a thickness of 370 μm when the wavelength of the light propagating through the embedded optical waveguides 21, 22 is 1.55 μm.

Moreover, the polarization directions of the polarizers 32, 33 differ by 45 degrees and, as shown in FIG. 3, are arranged with the Faraday rotator 31 inserted between them so that non-reciprocal operation can be realized by using a magnet (not shown) to apply a magnetic field in the direction of the optical axis. The material of the polarizers 32, 33 is not particularly limited but a birefringent crystal, such as polarized glass, rutile, crystal or the like, can be used. Although the optical isolator element 30 may be configured to have the Faraday rotator 31 and polarizers 32, 33 directly adhered by optical adhesive, it is more preferable to form an intervening antireflection coating on each surface.

Next, the internal structure of the waveguide layer 12 will be explained.

Figure 4:
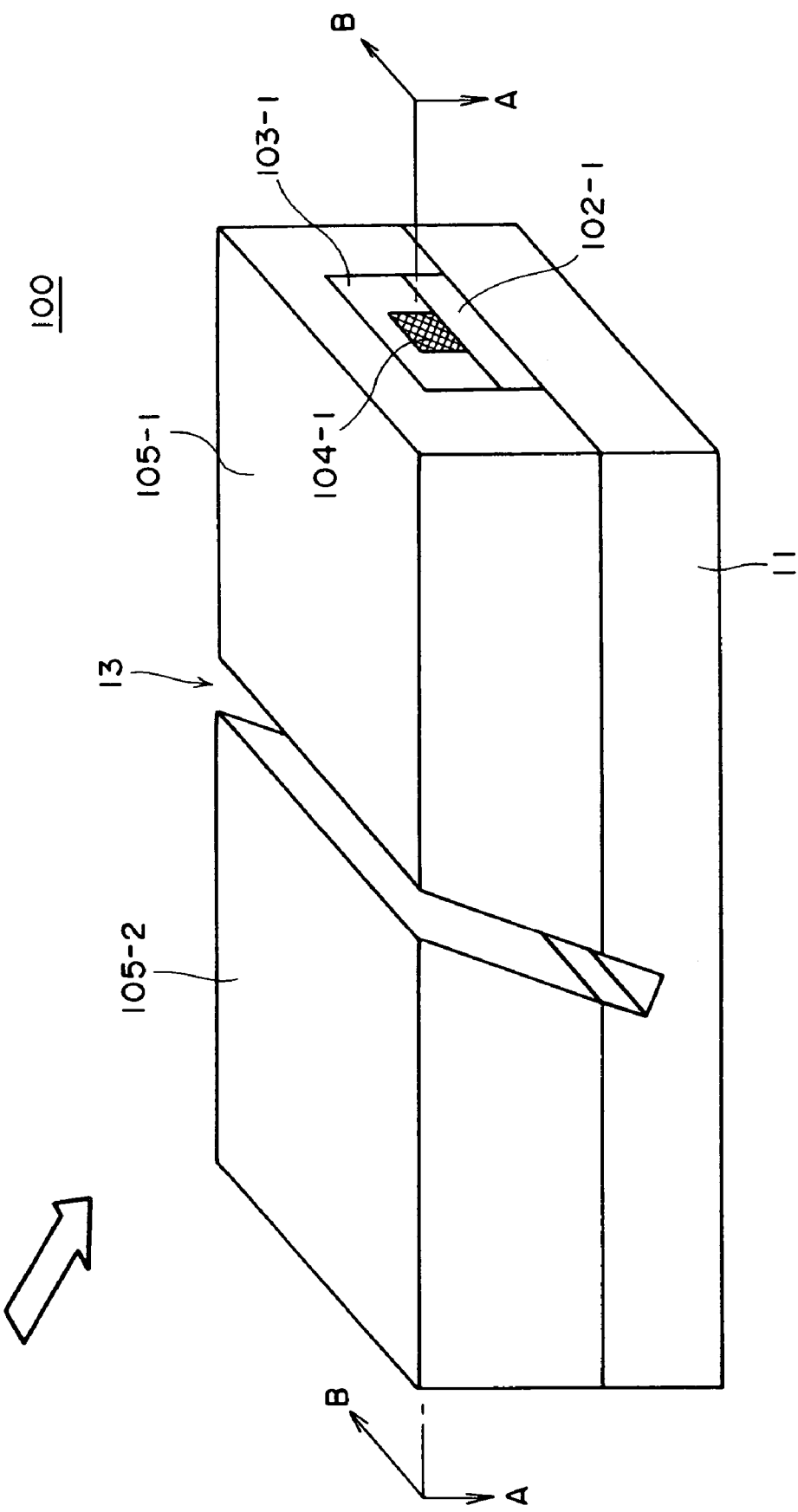
FIG. 4 is a schematic perspective view showing a part of a region 100 shown in FIG. 2.
Figure 5:
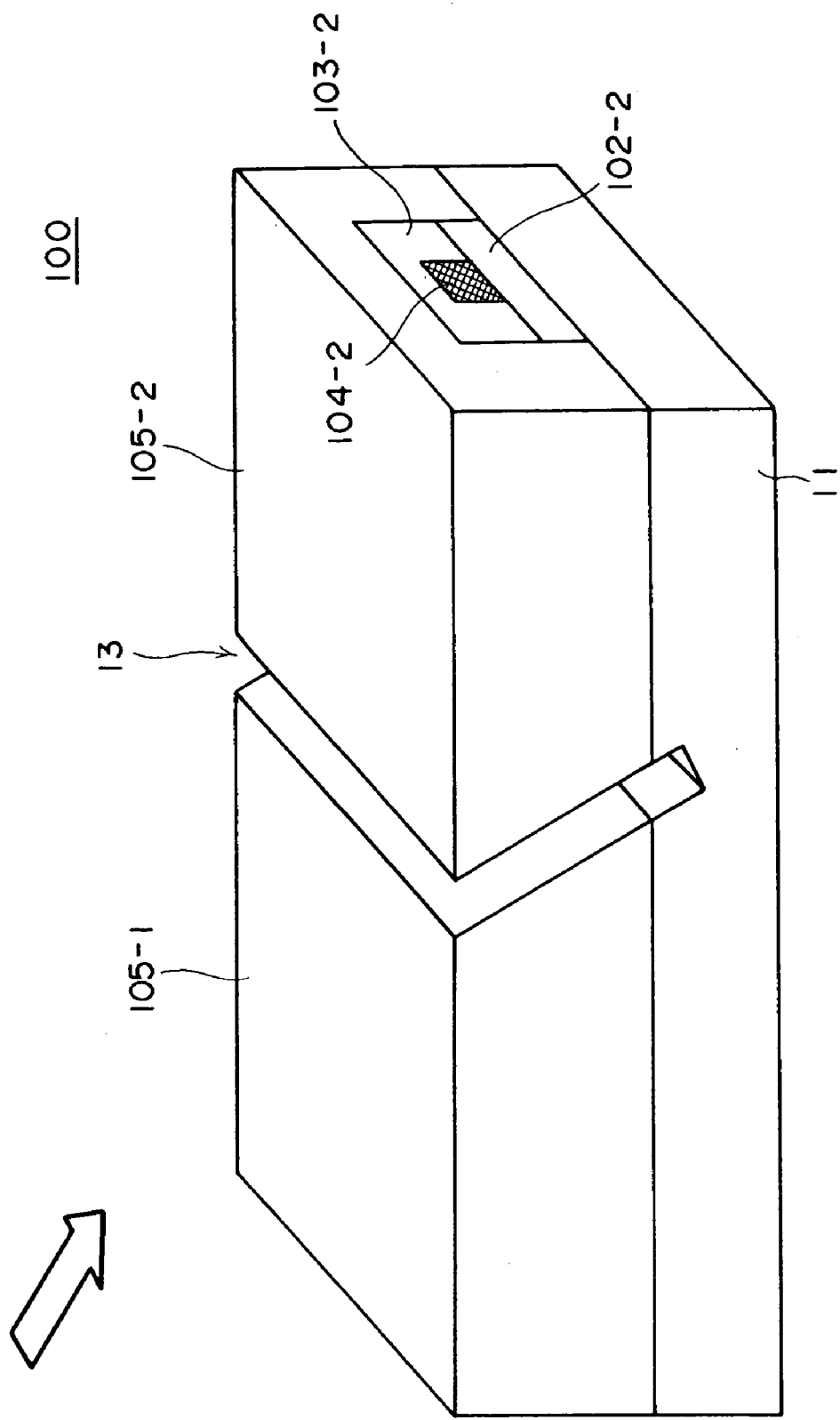
FIG. 5 is a schematic perspective view showing the region 100 from opposite direction of FIG. 4.

FIG. 4 is a schematic perspective view showing the region 100 designated in FIG. 2 and FIG. 5 is a schematic perspective view showing the region 100 seen from the opposite direction of FIG. 4. In addition, in FIGS. 4 and 5, the optical isolator element 30 inserted in the groove 13 is omitted (and is also omitted from FIGS. 6 and 7 explained below). The region 100 is a part of the waveguide layer 12 where embedded optical waveguides 21 and 22 are present on opposite sides of the groove 13. This embodiment includes five such regions 100 all of the same structure.

As shown in FIG. 4 and FIG. 5, the region 100 comprises the substrate 11, lower cladding layers 102-1 and 102-2 (sometimes collectively called "lower cladding layer 102"), upper cladding layers 103-1 and 103-2 (sometimes collectively called "upper cladding layer 103"), core regions 104-1 and 104-2 (sometimes collectively called "core region 104") and optical resin layers 105-1 and 105-2 (sometimes collectively called "optical resin layer 105"). The part including the lower cladding layer 102-1, the upper cladding layer 103-1, the core region 104-1 and the optical resin layer 105-1 is separated by a groove 13 from the part including the lower cladding layer 102-2, the upper cladding layer 103-2, the core region 104-2 and the optical resin layer 105-2.

The groove 13 is formed on the upper face of the substrate 11 to extend downward, making it possible to fully insert an optical isolator so as to cover the whole cross-sectional area of the core region 104, the upper cladding layer 103 and the lower cladding layer 102 with a filter.

The lower cladding layer 102-1 and upper cladding layer 103-1 serve as a "first cladding" of the embedded optical waveguide 21 and also as a "second core.". The lower cladding layer 102-2 and upper cladding layer 103-2 serve as the "first cladding" and of the embedded optical waveguide 22 and also as a "second core.". The material of the lower cladding layers 102-1 and 102-2 and the upper cladding layers 103-1 and 103-2 is not particularly limited insofar as the refractive indexes of the cladding layers are lower than the refractive index of the core region 104 but silica glass or polymer is preferably used as the material of the substrate 11 and the core region 104.

The core region 104-1 serves as a "first core" comprised of the embedded optical waveguide 21 and is formed on part of the surface of the lower cladding layer 102-1 and is covered with the upper cladding layer 103-1. The core region 104-2 serves as a "first core" comprised of the embedded optical waveguide 22 and is formed on part of the surface of the lower cladding layer 102-2 and is covered with the upper cladding layer 103-2. The material of the core region 104 is not particularly limited insofar as the refractive index of the core region 104 is higher than the refractive indexes of the cladding layers but silica glass or polymer is preferably used as the material of the core region 104.

The optical resin layer 105-1 serves as a "second cladding" of the embedded optical waveguide 21 and the optical resin layer 105-2 serves as a "second cladding" of the embedded optical waveguide 22. The material of the optical resin layer 105 is not particularly limited insofar as the refractive index of the optical resin is lower than the refractive indexes of the cladding layers but an ultraviolet curable resin is preferably used as the material of the optical resin layer 105.

Figure 6:
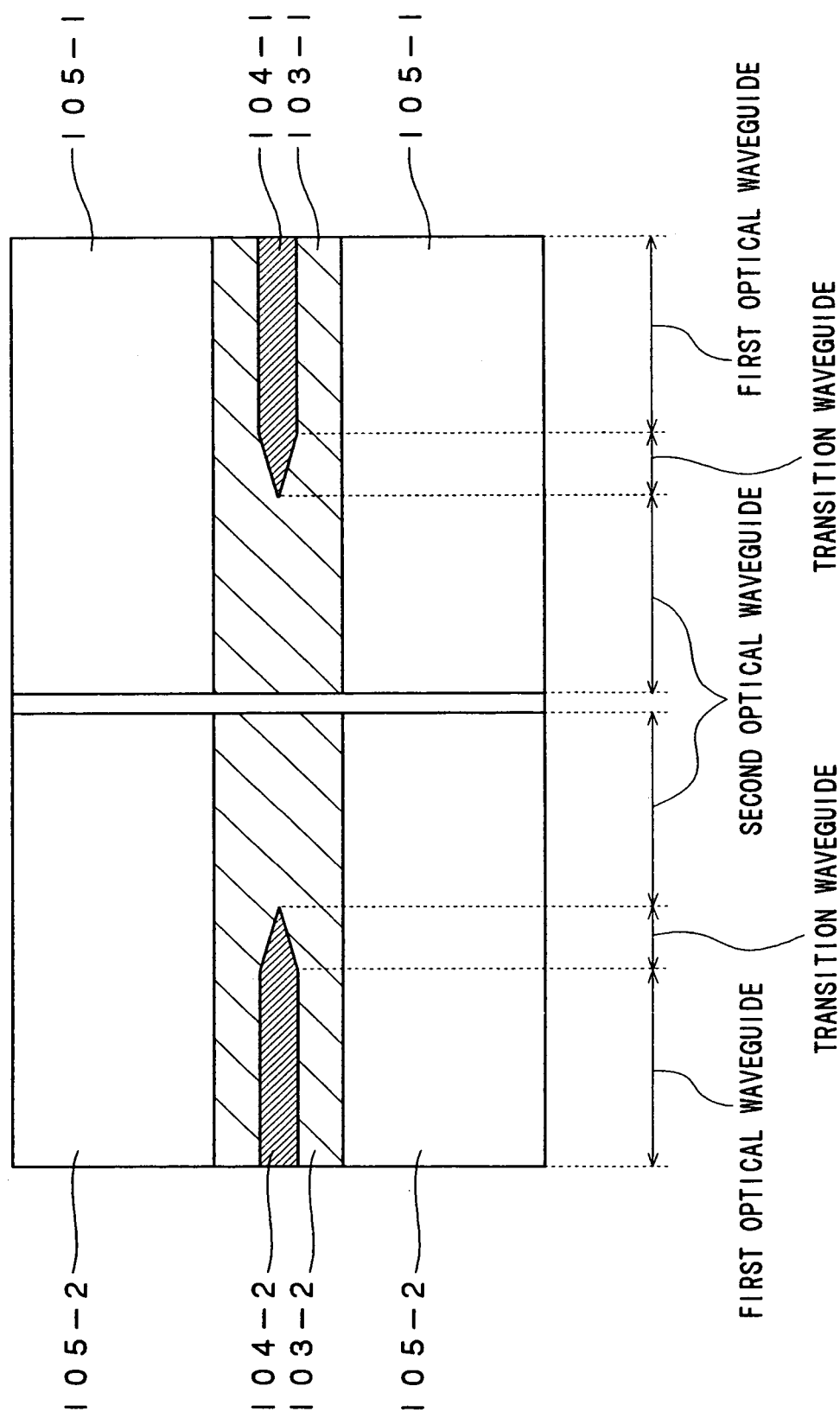
FIG. 6 is a cross sectional view taken along line A—A in FIG. 4.
Figure 7:
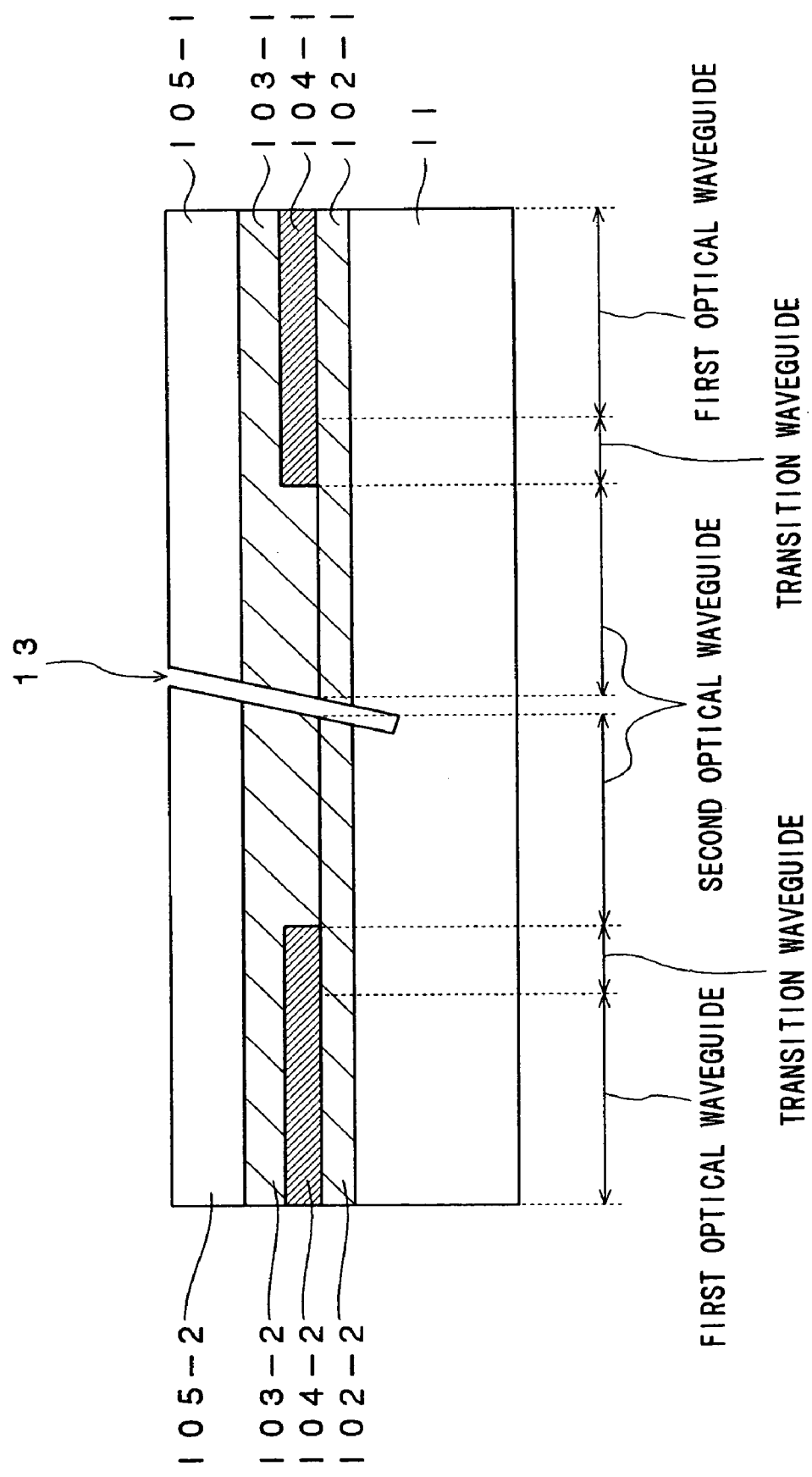
FIG. 7 is a cross sectional view taken along line B—B in FIG. 4.

FIG. 6 is a cross sectional view taken along line A—A in FIG. 4, and FIG. 7 is a cross sectional view taken along line B—B in FIG. 4. As shown in FIG. 6 and FIG. 7, the core region 104-1 (104-2) has substantially fixed width (length of the up and down direction in FIG. 6) over a given distance from the end face, and after that, the width of the end portion of the core region 104-1 (104-2) becomes gradually narrower as it goes toward the groove 13. For this reason, the core region 104-1 (104-2) is not present between the lower cladding layer 102-1 (102-2) and the upper cladding layer 103-1 (103-2) in the portion near the groove 13, so that the upper cladding layer 103-1 is directly laminated on the lower cladding layer 102-1 and the upper cladding layer 103-2 is directly laminated on the lower cladding layer 102-2.

In this specification, the sections of the embedded optical waveguide 21, 22 where the width of the core regions 104-1, 104-2 is set substantially uniform is called the "first waveguide", the section where the core regions 104-1, 104-2 are not present is called the "second waveguide", and the section where the width of the core regions 104-1, 104-2 becomes gradually narrower toward the groove 13 is called the "transition waveguide.". In each optical waveguide, the first waveguide, the transition waveguide and the second waveguide are united and are collectively called a "spot-size transformer". Thus, in the waveguide-embedded optical circuit 10 of this embodiment, multiple pairs of spot-size transformers facing each other across the groove 13 are provided and in each spot-size transformer, the second waveguide is located on the side of the groove 13 and the first waveguide is located on the side opposite from the groove 13 (the end side of the waveguide-embedded optical circuit 10).

The first waveguide is a channel type optical waveguide constituted by the first core and the first cladding, and the second optical waveguide is a channel type optical waveguide constituted by the second core and the second cladding. As described above, the first cladding and the second core are both constituted by the laminated body consisting of the lower cladding layer 102-1 and the upper cladding layer 103-1, or by the laminated body consisting of the lower cladding layer 102-2 and the upper cladding layer 103-2. Moreover, each transition waveguide is constituted by the region where the core changes from the first core to the second core and the cladding changes from the first cladding to the second cladding. In this transition region, the spot-size of the propagated beam changes from a relatively small spot-size in the first optical waveguide to a relatively large spot-size in the second optical waveguide (or from a relatively large spot-size in the second optical waveguide to a relatively small spot-size in the first optical waveguide). That is, the actual spot-size transformation is performed in the transition waveguide.

Figure 8:
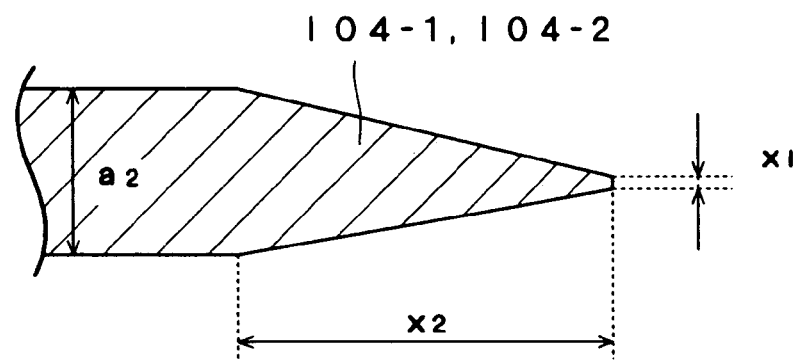
FIG. 8 is an enlarged plain view showing the tip of core regions 104-1, 104-2.

It is preferable for the end of the taper portion of the core regions 104-1, 104-2 to be sharper from the theoretical viewpoint of suppressing excess loss. However, from the viewpoint of actual fabrication, the shape with the end of the taper portion cut off as shown in FIG. 8 is preferable. In this case, the width of the end part "$x_1$" is preferably set to a small value within the range which does not vary greatly depending on the fabrication conditions. Specifically, it is preferably set to 1 μm or less, more preferably set to 0.6 μm or less. If the width $x_1$ of the end part is set to 1 μm or less, it becomes possible to suppress excess loss to about 0.8 dB or less in most cases, and if the width $x_1$ of the end part is set to 0.6 μm or less, it becomes possible to suppress excess loss to about 0.4 dB or less in most cases. The length "$x_2$" of the tapered part is not limited but it is preferably set between about 100 times and 200 times the width $a_2$ of the untapered part (the region corresponding to the first optical waveguide) in the core region 104-1, 104-2. By these settings, it becomes possible to prevent enlargement of the waveguide-embedded optical circuit 10 and effectively suppress the excess loss generated in the transition waveguide.

As shown in FIG. 6 and FIG. 7, the width (length of the up and down direction in FIG. 6) and the height (length of the up and down direction in FIG. 7) of the laminated body composed of the lower cladding layer 102-1 and the upper cladding layer 103-1, i.e., the first cladding and the second core of the embedded optical waveguide 21, is substantially constant in the section from the end of face the waveguide-embedded optical circuit 10 to the groove 13. The same is true of the laminated body composed of the lower cladding layer 102-2 and the upper cladding layer 103-2.

Figure 9:
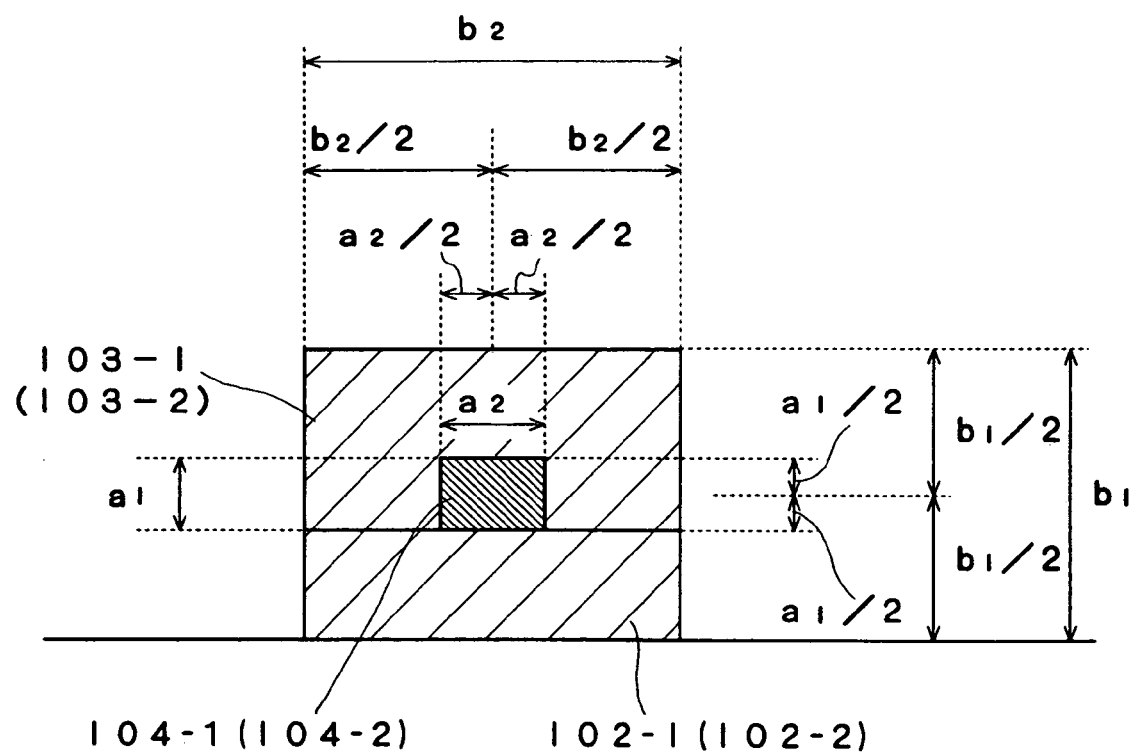
FIG. 9 shows in detail the positional relationship among the lower cladding layer 102-1 (102-2), upper cladding layer 103-1 (103-2), and core region 104-1 (104-2) at the end of the region 100.

FIG. 9 shows in detail the positional relationship among the lower cladding layer 102-1 (102-2), upper cladding 103-1 (103-2), and core region 104-1 (104-2) at the end of the region 100.

As shown in FIG. 9, defining the height of the core region 104-1 (104-2) as $a_1$ and the height of the laminated body consisting of the lower cladding layer 102-1 (102-2) and the upper cladding layer 103-1 (103-2) as $b_1$, it is preferable for the line that divides the core region 104-1 (104-2) at $a_1/2$ in the height direction to substantially coincide with the line that divides the associated laminated body at $b_1/2$ in the height direction. That is, it is preferable to align the center line in the height direction of the core region 104-1 (104-2) and the center line in the height direction of the laminated body so as substantially coincide. Similarly, defining the width of the core region 104-1 (104-2) as $a_2$ and the width of the laminated body as $b_2$, it is preferable for the line that divides the core region 104-1 (104-2) at $a_2/2$ in the height direction to substantially coincide with the line that divides the associated laminated body at $b_2/2$ in the height direction. That is, it is preferable to align the center line in the width direction of the core region 104-1 (104-2) and the center line in the width direction of the laminated body so as to substantially coincide. This means that it is preferable to align the centers in the width direction of the core regions 104-1, 104-2 and the centers in the width direction of the layered members so as to substantially coincide.

The height $a_1$ and width $a_2$ of the core regions 104-1, 104-2 are not particularly limited but are preferably set to almost the same size as the diameter of the core of an ordinary optical fiber (about 7 μm). When they are so set, it becomes possible to connect the first optical waveguide of the embedded optical waveguide 21 (22) and an optical fiber directly by a V-groove etc.

In the region 100 having the above-described configuration, after the light inputting to the first optical waveguide of the embedded optical waveguide 21 propagates through the first core to the groove 13, it gradually penetrates the first cladding in the transition waveguide where the width of the first core becomes gradually narrower. Thus, in the transition waveguide, the first cladding begins to serve as a second core as it goes toward the groove 13 and comes to serve almost totally as a second core in the second optical waveguide. Therefore, the beam spot outputting from the groove 13 is expanded to larger than the beam spot inputting to the first optical waveguide. Further, after the light inputting to the second optical waveguide of the embedded optical waveguide 22 propagates through the second core to the opposite side from the groove 13, the incident light gradually penetrates the first cladding in the transition waveguide where the width of the first core becomes gradually wider. Thus, in the transition waveguide, the second core begins to serve as the first cladding as it goes toward the opposite side from the groove 13 and comes to serve almost totally as the first cladding in the first optical waveguide. Therefore, the beam spot outputting from the first optical waveguide is reduced to smaller than the beam spot inputting from the groove 13.

In the waveguide-embedded optical circuit 10 of this embodiment, since the portions where the embedded optical waveguide 21 and the embedded optical waveguide 22 are separated by the groove 13 each has the second optical waveguide with a core of larger diameter than the first optical waveguide, the beam spot propagating across the groove 13 is expanded to larger than the beam spot propagating through the first waveguide. As a result, it is possible to significantly reduce the diffraction loss arising in the groove 13. Therefore, it becomes possible to reduce the diffraction loss occurring in each channel and exploit the advantage of the waveguide-embedded optical circuit being capable of miniaturization. Further, in the waveguide-embedded optical circuit 10 of this embodiment, as explained with reference to FIG. 9, it is possible to minimize the loss arising in the transition waveguide because the center of the beam spot hardly shifts in the transition waveguide because the center portions of the core regions 104-1, 104-2, which are the center portions of the first cores and the center portions of the laminated bodies constituting the second cores, are made coincident.

Next, the fabrication process of the waveguide-embedded optical circuit 10 of this embodiment will be explained with reference to the drawings. Although only the region 100 is explained below, the region 100 is not separately fabricated and is integrated with the waveguide-embedded optical circuit.

Figure 10:
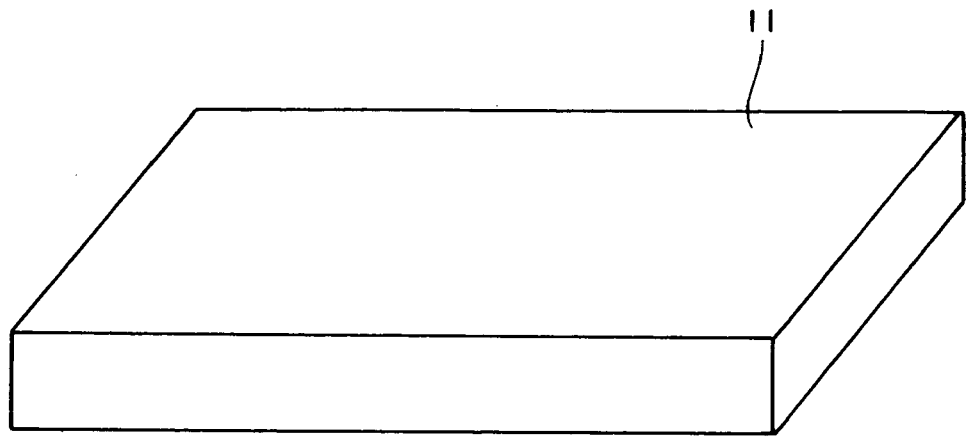
FIG. 10 is a schematic perspective view showing the state of the region 100 during the process of fabricating the waveguide-embedded optical circuit 10.
Figure 11:
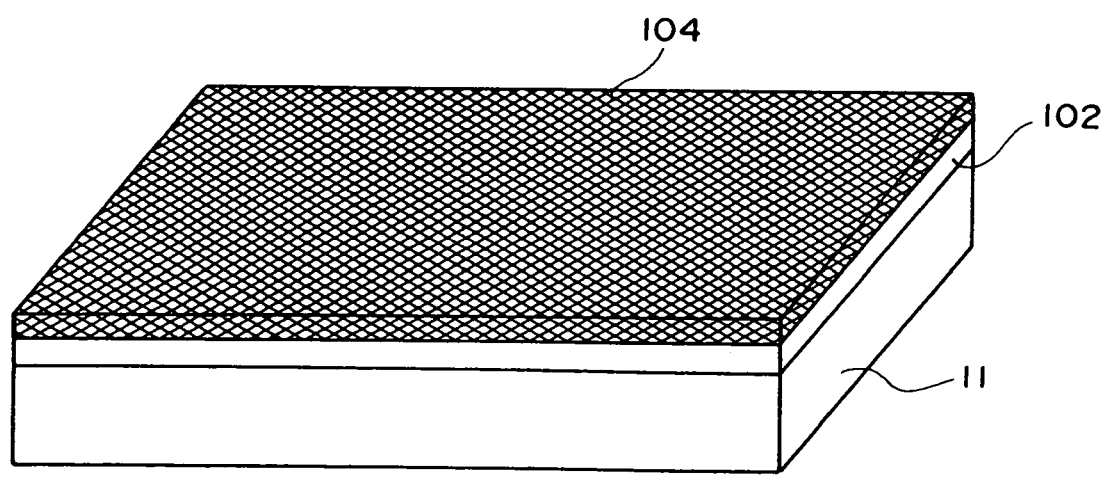
FIG. 11 is a schematic perspective view showing the state of the region 100 during the process of fabricating the waveguide-embedded optical circuit 10.

First, a substrate 11 of predetermined area is prepared (FIG. 10) and the lower cladding layer 102 and the core region 104 are formed in order over the whole surface of the substrate 11 (FIG. 11). The method of forming the lower cladding layer 102 and the core region 104 is not particularly limited but a vapor phase growth process using chemical species containing elements for forming the lower cladding layer 102 and the core region 104, such as a CVD, a sputtering, a vacuum deposition, an FHD (Flame Hydrolysis Deposition), a coating or the like, is preferably used. Further, in the case where silica glass is used as the material of the lower cladding layer 102 and the core region 104, the CVD or the FHD is more preferably used from the viewpoint of productivity and quality. Further, in the case where polymer is used as the material of the lower cladding layer 102 and the core region 104, a coating is more preferably used from the viewpoint of easy processing.

Figure 12:
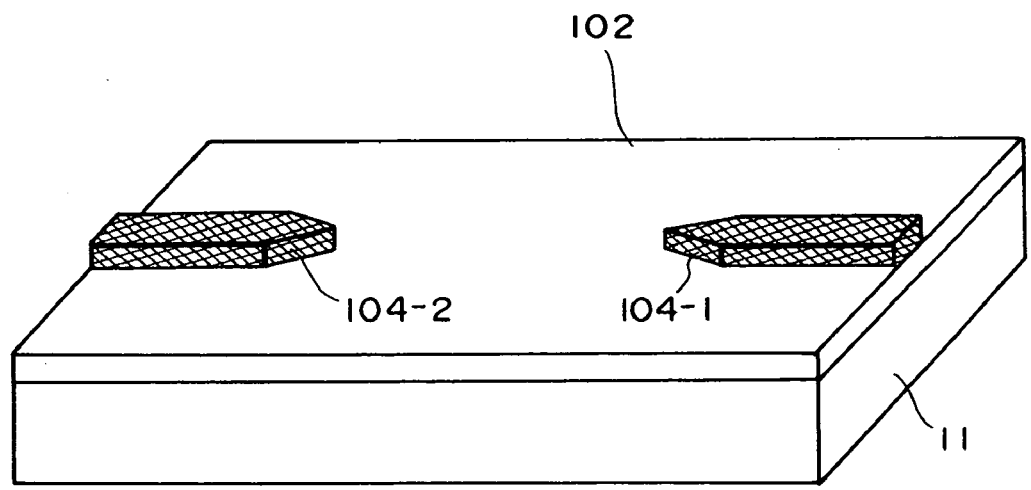
FIG. 12 is a schematic perspective view showing the state of the region 100 during the process of fabricating the waveguide-embedded optical circuit 10.

Next, the core regions 104-1, 104-2 are formed by patterning the core region 104 (FIG. 12). The core regions 104-1, 104-2 are formed to the shape mentioned above so as to provide the part where the width is fixed and the part where the width becomes gradually narrower. The method of patterning the core region 104 is not particularly limited but it is preferable to form a metal mask layer over the whole surface of the core region 104, apply photoresist on the metal mask layer, form an etching mask for leaving the core regions 104-1, 104-2, and remove the unnecessary portions of the core region 104 using the etching mask. The removal of the unnecessary portions of the core region 104 is preferably performed by dry etching.

Figure 13:
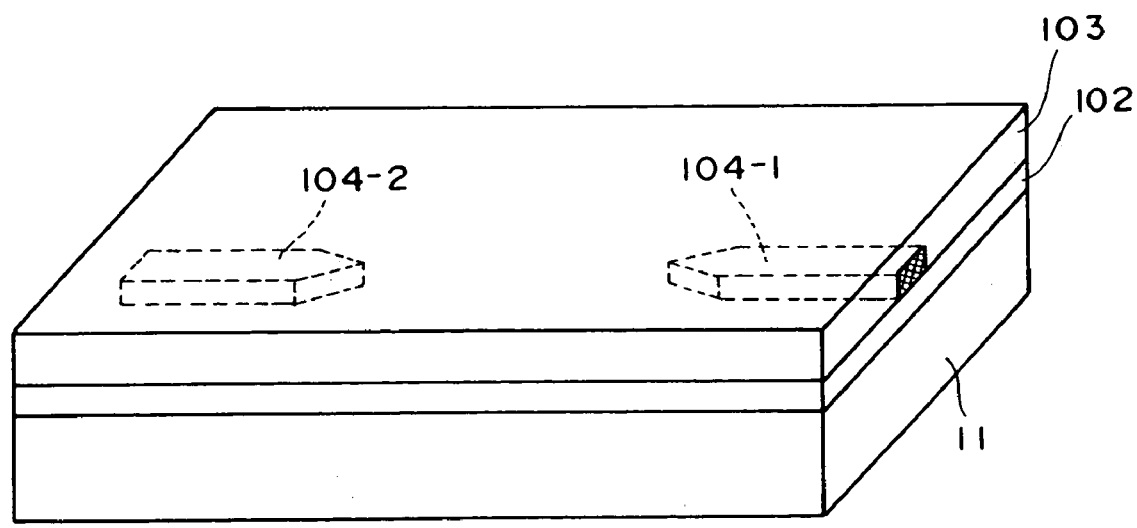
FIG. 13 is a schematic perspective view showing the state of the region 100 during the process of fabricating the waveguide-embedded optical circuit 10.

Next, the upper cladding layer 103 is formed over the whole surface of the lower cladding layer 102 (FIG. 13). The method of forming the upper cladding layer 103 is not particularly limited, but the vapor phase growth process using chemical species containing elements for forming the upper cladding layer 103 or coating is preferably used in the same way as when forming the lower cladding layer 102 and the core region 104. Further, in the case where silica glass is used as the material of the upper cladding layer 103, the CVD or the FHD is more preferably used. Further, in the case where polymer is used as a material of the upper cladding layer 103, the coating is more preferably used.

Figure 14:
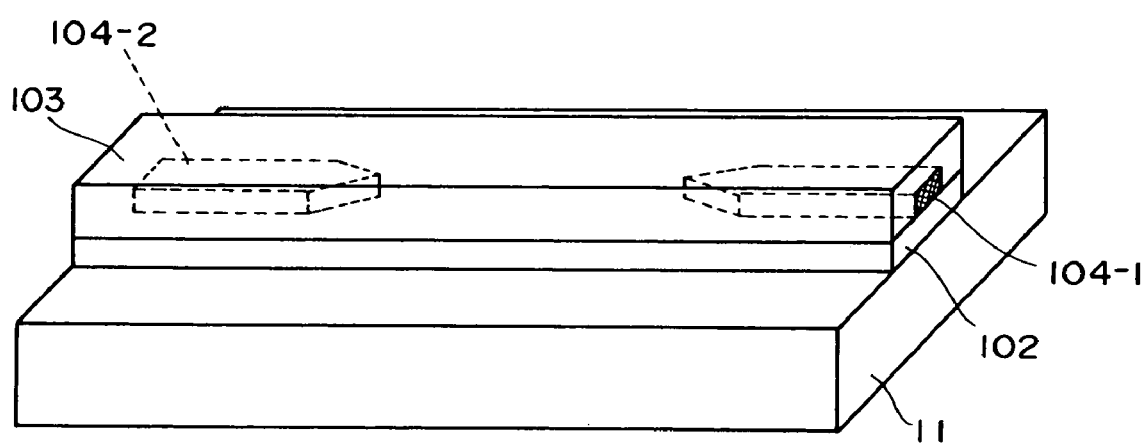
FIG. 14 is a schematic perspective view showing the state of the region 100 during the process of fabricating the waveguide-embedded optical circuit 10.

Next, a rod-shaped member is formed by patterning the laminated body composed of the lower cladding layer 102 and the upper cladding layer 103 (the core region 104 is partially included) (FIG. 14). The rod-shaped member is used as the first optical waveguides and the second optical waveguides (second cores) of the embedded optical waveguides 21, 22. The method of patterning the laminated body composed of the lower cladding layer 102 and the upper cladding layer 103 is not particularly limited, but it is preferable to form a metal mask layer over the whole surface of the upper cladding layer 103, apply photoresist on the metal mask layer, form an etching mask as to leave the rod-shaped member, and remove the unnecessary portions of the lower cladding layer 102 and the upper cladding layer 103 using the etching mask. The removal of the unnecessary portions of the lower cladding layer 102 and the upper cladding layer 103 is preferably performed by dry etching.

Figure 15:
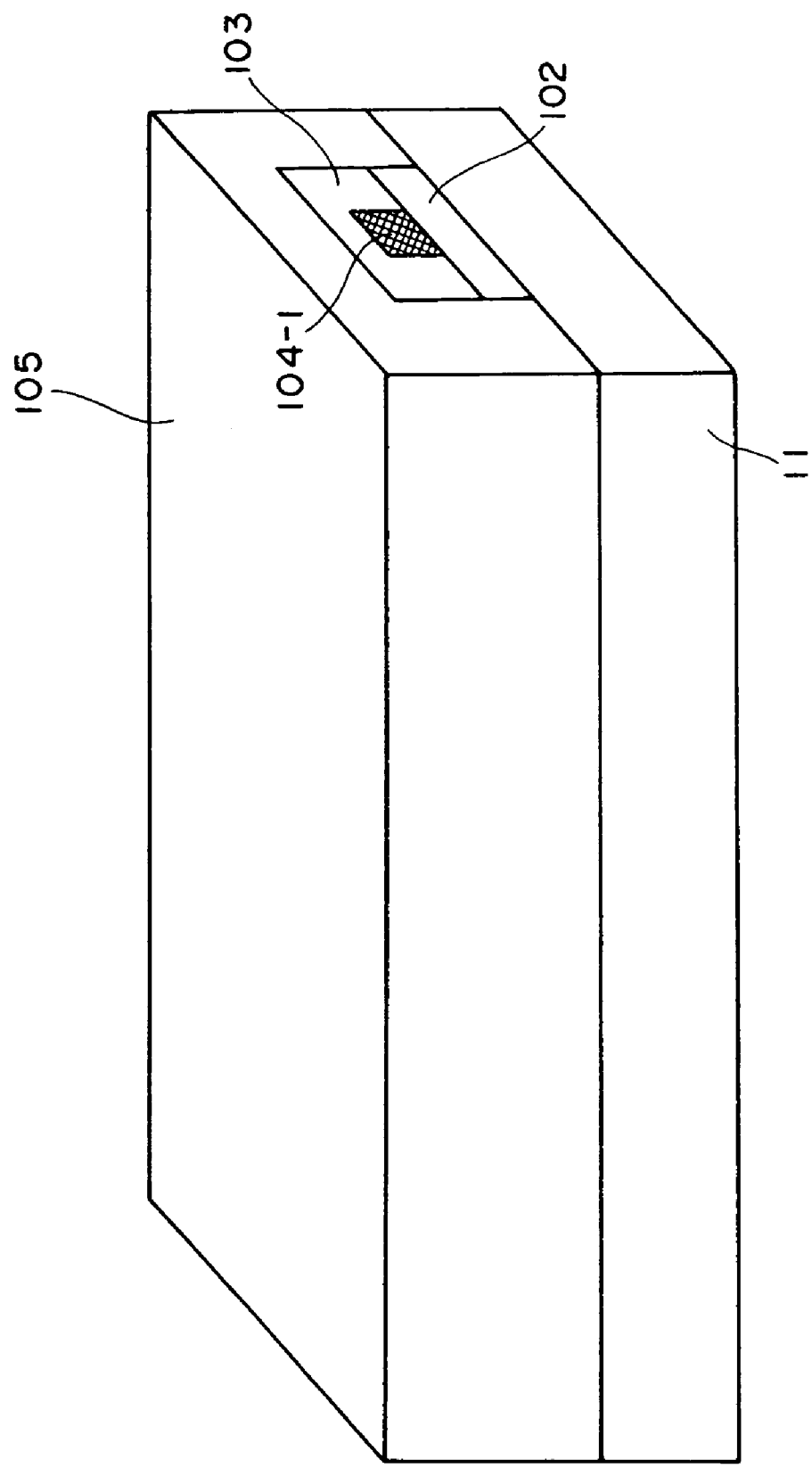
FIG. 15 is a schematic perspective view showing the state of the region 100 during the process of fabricating the waveguide-embedded optical circuit 10.

Further, the optical resin layer 105 is formed over the whole surface of the substrate 11 so as to cover the rod-shaped member (FIG. 15), the optical resin layer 105 is cured, and the groove 13 is formed (FIG. 4, FIG. 5). The method of forming the groove 13 is not particularly limited, but it is preferably formed by slicing using a slicing machine.

The optical isolator element shown FIG. 3 is prepared separately, inserted in the groove 13, and fixed by optical adhesives. This completes the fabrication of the waveguide-embedded optical circuit 10 of this embodiment. However, the method of producing the waveguide-embedded optical circuit 10 of this embodiment is not limited to the foregoing, and it can also be fabricated by other methods.

As described above, the waveguide-embedded optical circuit 10 of this embodiment is provided with multiple channels each consisting of embedded optical guides 21, 22 and each of the embedded optical waveguide 21, 22 comprises the first waveguide, the transition waveguide and the second waveguide. Owing to this configuration, it is possible to significantly reduce the diffraction loss arising in the groove 13. Therefore, it becomes possible to reduce the diffraction loss occurring in each channel and exploit the advantage of the waveguide-embedded optical circuit being capable of miniaturization. Further, in the waveguide-embedded optical circuit 10 of this embodiment, it is possible to minimize the loss arising in the transition waveguide because the center of the beam spot hardly shifts in the transition waveguide because the center of the first core and the center of the second core (first cladding) are made coincident.

Next, the formation angle of the groove 13 and the insertion angle of the optical isolator element 30 will be explained.

Figure 16:
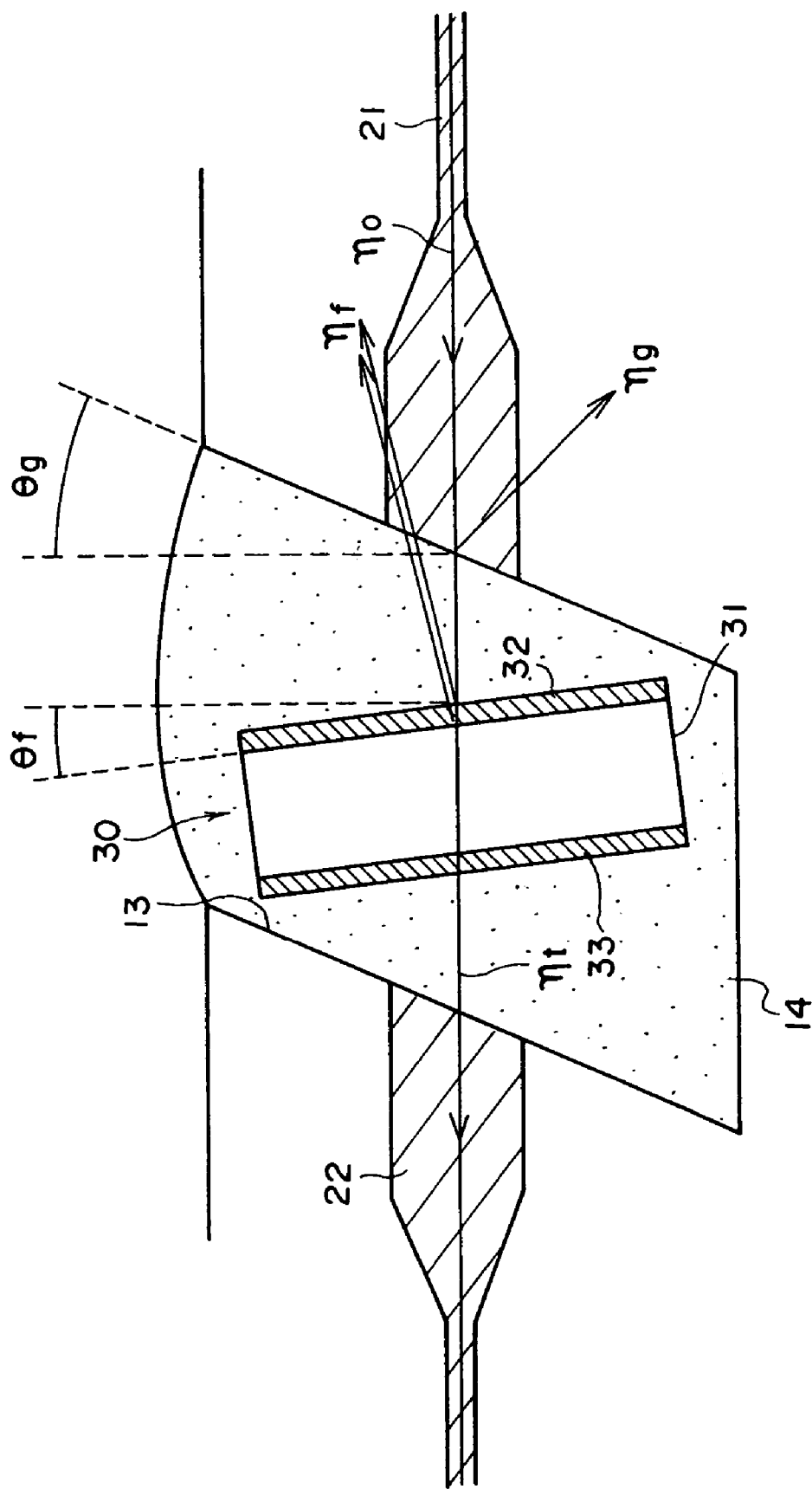
FIG. 16 is an enlarged sectional view showing an optical isolator element 30 inserted in a groove 13.

FIG. 16 is an enlarged sectional view showing the optical isolator element 30 inserted in the groove 13.

As shown in FIG. 16, defining the formation angle of the groove 13 (the angle between a plane perpendicular to the direction of propagation of the incident light η0 through the embedded optical waveguide 21 and the inner wall of the groove 13) as θg, and the insertion angle of a Faraday rotator 31 (the angle between the plane perpendicular to the direction of propagation of the incident light η0 through the embedded optical waveguide 21 and the surface of the Faraday rotator 31) as θf, it is preferable to set the angles so that θg≠0 degree and θf≠0 degree. Thus, if the formation angle θg of the groove 13 is set so that θg≠0, most of reflective light ηg produced at the surface of the optical adhesives 14 does not return to the embedded optical waveguide 21 and if the insertion angle θf of the Faraday rotator 31 is set so that θf≠0, most of reflective light ηf produced at the surface of the Faraday rotator 31 or the polarizer 32 does not return to the embedded optical waveguide 21.

Moreover, if the insertion angle θf of the Faraday rotator 31 is set at a predetermined angle based on the formation angle θg of the groove 13, misalignment between the optical axes of the incident light η0 and transmitted light ηt caused by the inclination of the groove 13 can be rectified.

Figure 17:
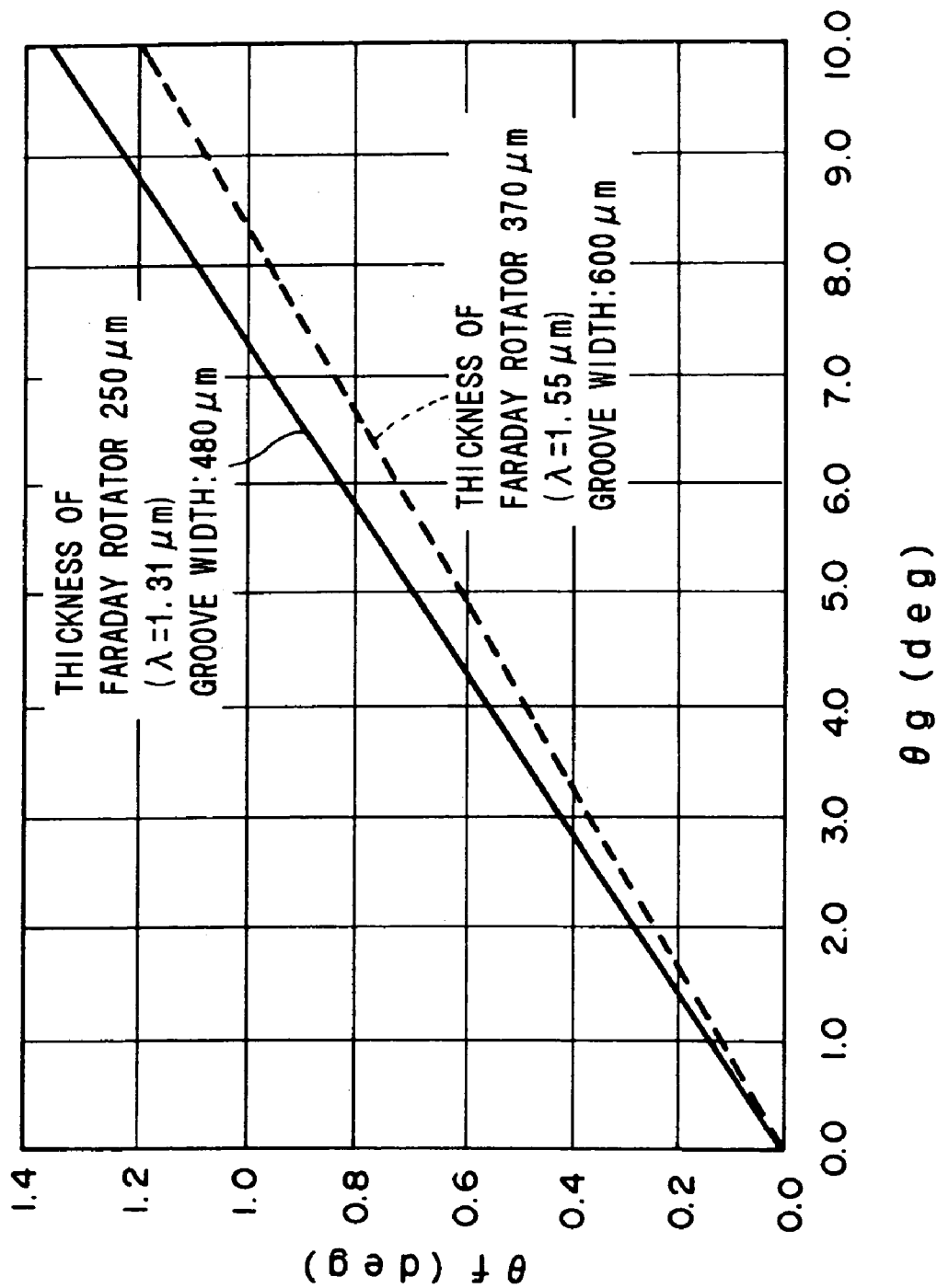
FIG. 17 is graph showing a desirable relationship between formation angle θg of the groove 13 and insertion angle θf of a Faraday rotator 30.

FIG. 17 is a graph which shows the desirable relation between the formation angle θg of the groove 13 and the insertion angle θf of the Faraday rotator 31. Specifically, FIG. 17 shows the foregoing desirable relationship in the case where, when the wavelength of the incident light η0 propagating through the embedded optical waveguide 21 is 1.31 μm, the thickness of the Faraday rotator 31 is set at 250 μm and the width of the groove 13 at 480 μm, and the foregoing desirable relationship in the case where, when the wavelength of the incident light η0 propagating through the embedded optical waveguide 21 is 1.55 μm, the thickness of the Faraday rotator 31 is set at 370 μm and the width of the groove 13 at 600 μm.

If the insertion angle θf of the Faraday rotator 31 and the formation angle θg of the groove 13 are set in accordance with the relationship shown in FIG. 17, loss resulting from optical axis misalignment can be sharply reduced because the offset between the optical axes of the incident light η0 and the transmitted light ηt caused by inclination into the groove 13 is rectified by the inclination of the Faraday rotator 31.

Figure 18:
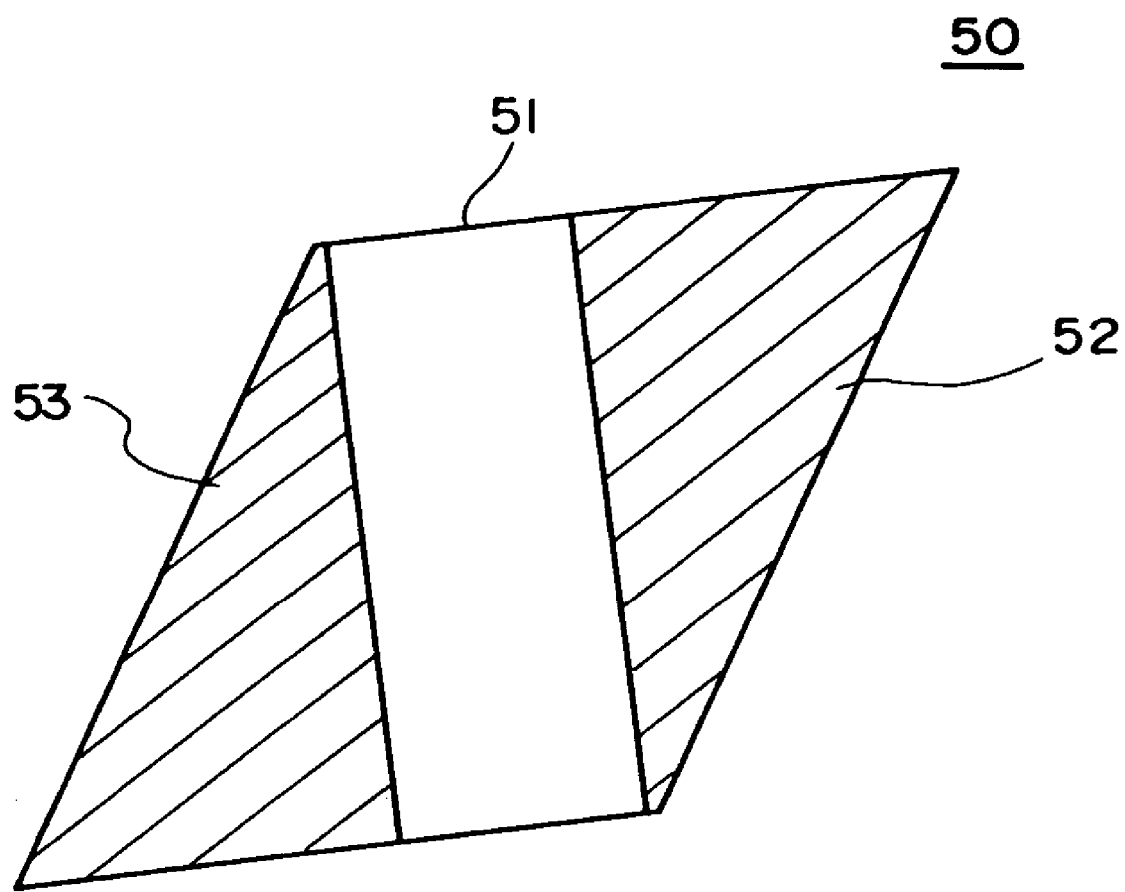
FIG. 18 is a schematic sectional view showing the structure of another optical isolator element 50 which can be inserted in the groove 13.

FIG. 18 is a schematic sectional view showing the structure of another optical isolator elements 50 which can be inserted in the groove 13.

Figure 19:
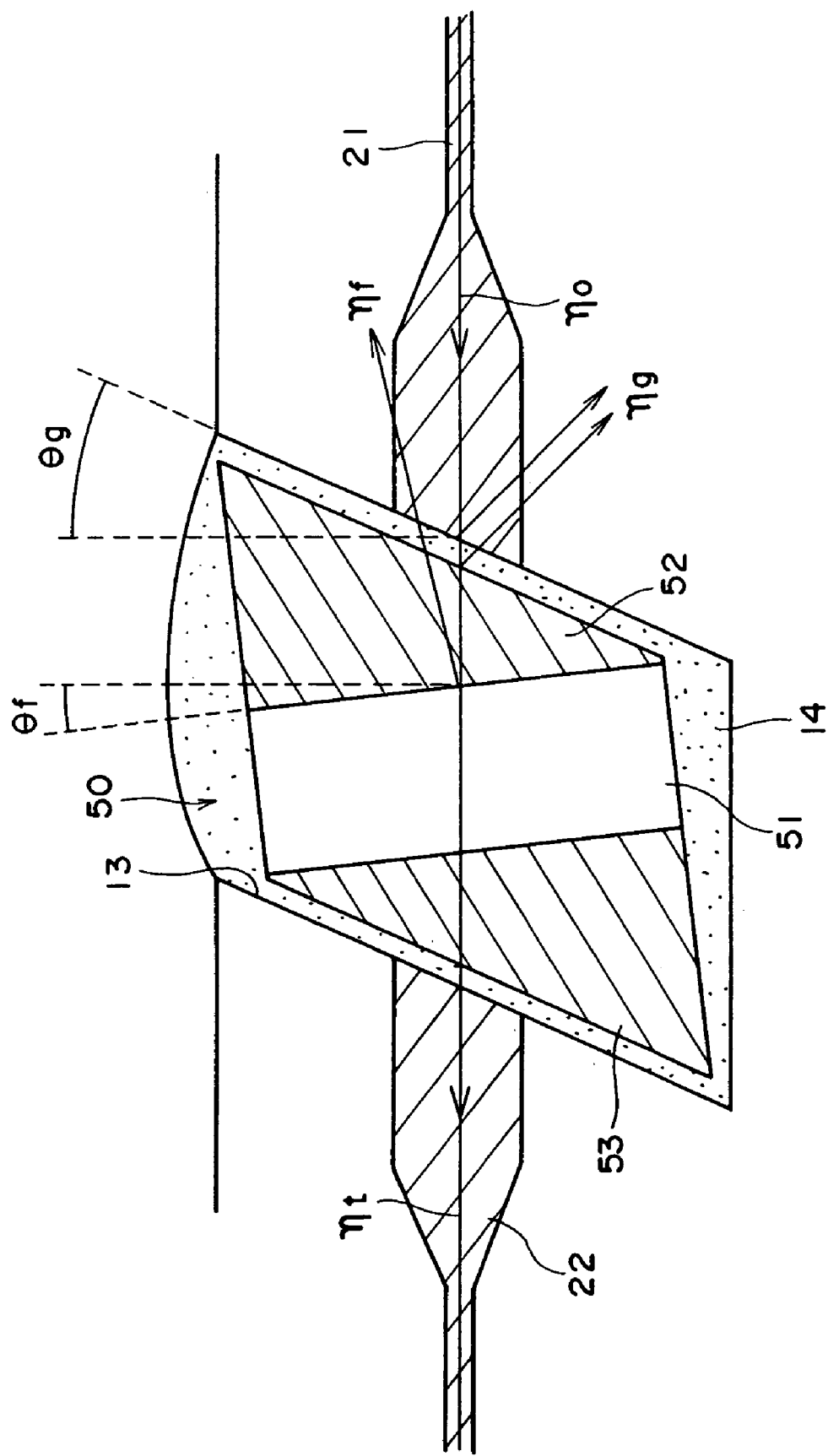
FIG. 19 is an enlarged sectional view showing the optical isolator element 50 inserted in the groove 13.

The optical isolator element 50 shown in FIG. 18 comprises a Faraday rotator 51 and wedge-shaped polarizers 52, 53 provided on opposing surfaces of the Faraday rotator 51. Thus, as shown in FIG. 19, if the insertion angle of the Faraday rotator 51 is set at θf≠0, most reflective light ηf produced at the surface of the optical adhesives 14 and the polarizer 52 does not return to the embedded optical waveguide 21. Moreover, as described regarding FIG. 17, in the so-configured optical isolator element 50, if the insertion angle θf of the Faraday rotator 51 is set at a predetermined angle based on the formation angle θg of the groove 13, the optical axis misalignment between the incident light η0 and transmitted light ηt caused by inclination of the groove 13 can be rectified.

Figure 20:
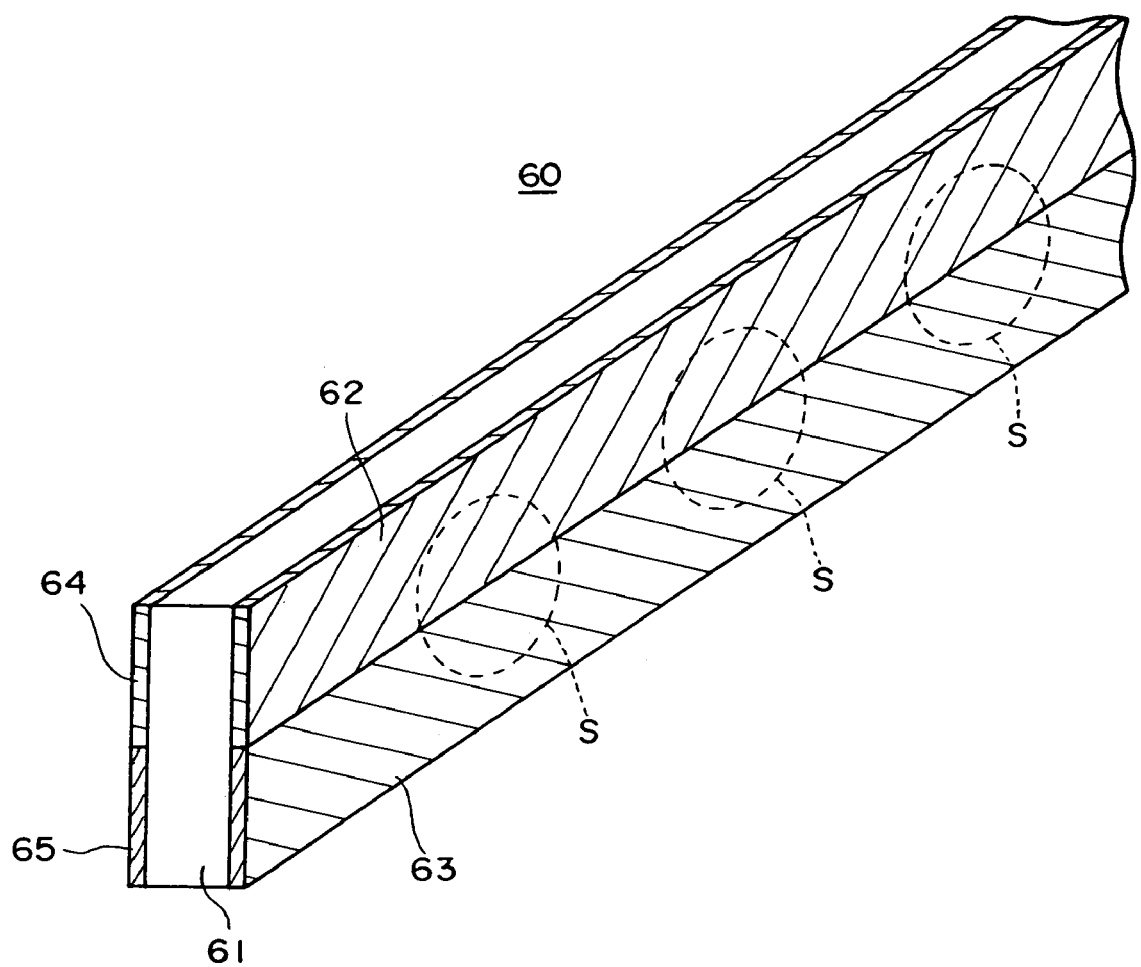
FIG. 20 is a schematic perspective view showing the structure of still another optical isolator element 60 which can be inserted in the groove 13.

FIG. 20 is a schematic perspective view showing the structure of still another optical isolator element 60 which can be inserted in the groove 13.

The optical isolator element 60 shown in FIG. 20 comprises a Faraday rotator 61 which rotates polarization by 45 degrees, birefringent elements 62, 63 provided on one surface of the Faraday rotator 61, and birefringent elements 64, 65 provided on the other (opposite) surface of the Faraday rotator 61. The material of the birefringent elements 62–65 can be, but is not limited to, crystal. As shown in FIG. 20, the birefringent element 62 is provided on one half (top half in FIG. 20) of the one surface of the Faraday rotator 61, and the birefringent element 63 is provided on the remaining half (bottom half in FIG. 20) of the one surface of the Faraday rotator 61. Moreover, the birefringent element 64 is provided on the part of the other surface of the Faraday rotator 61 that faces the birefringent element 62, and the birefringent element 65 is provided on the part of the other surface of the Faraday rotator 61 that faces the birefringent element 63.

Figure 21A:
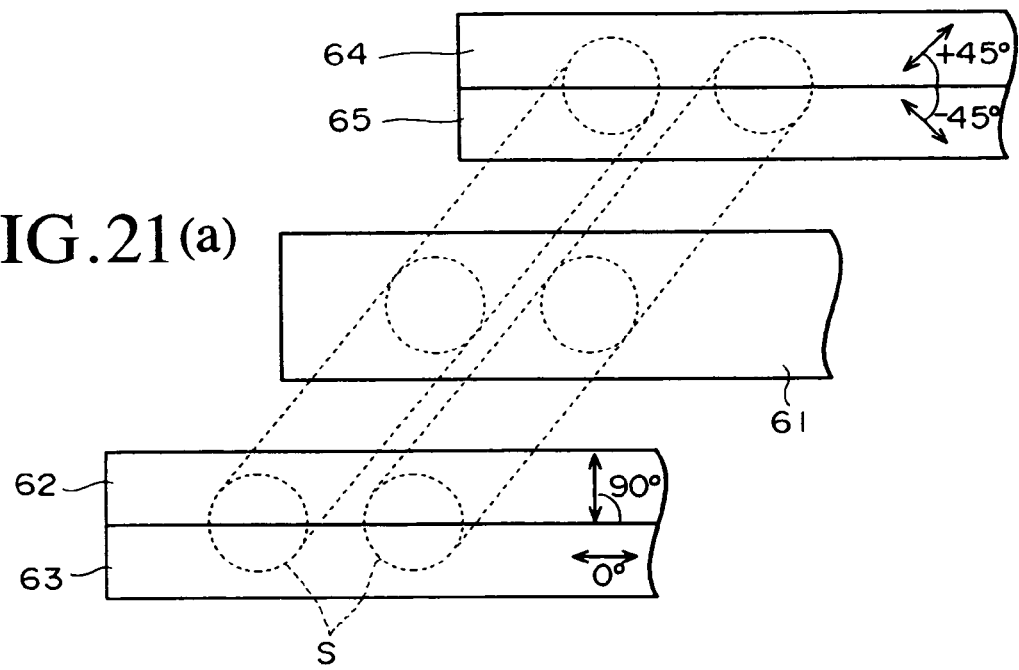
FIGS. 21(a)–21(b) show examples of the setting of the crystal axes of birefringent elements 62–65.
Figure 21B:
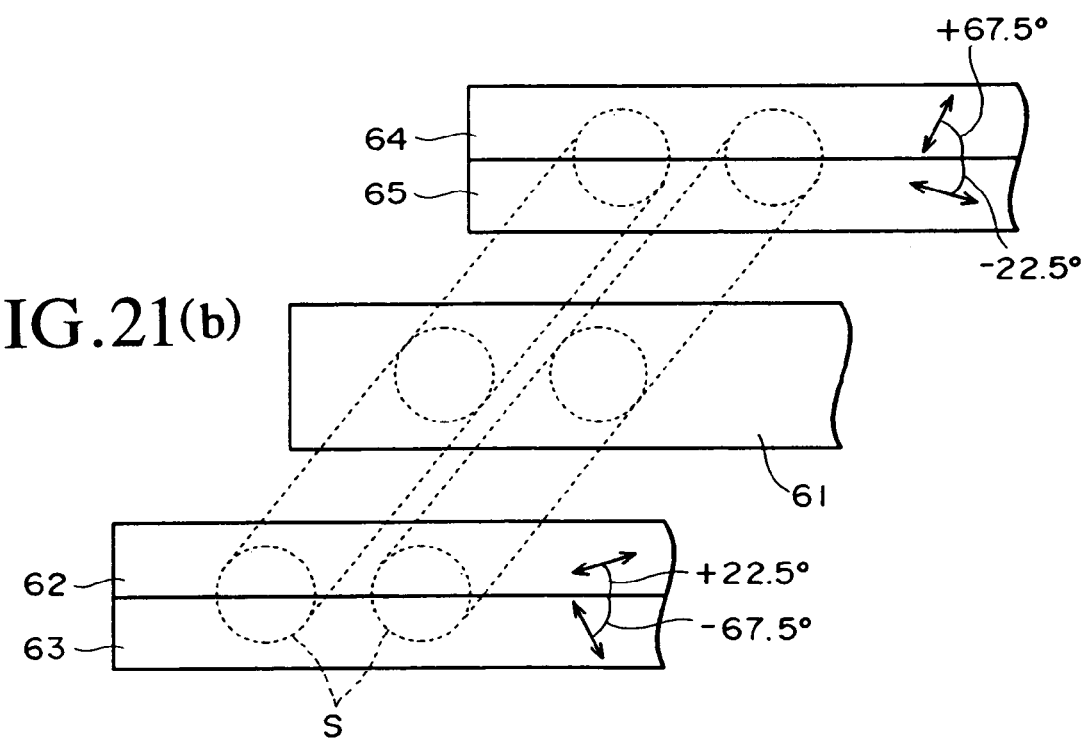

The crystal axis of the birefringent element 62 and the crystal axis of the birefringent element 63 lie at right angles, and the crystal axis of the birefringent element 64 and the crystal axis of the birefringent element 65 lie at right angles. Furthermore, the crystal axis of the birefringent element 62 and the crystal axis of the birefringent element 64 make an angle of about 45 degrees, and the crystal axis of the birefringent element 63 and the crystal axis of the birefringent element 65 make an angle of about 45 degrees. In this case, as shown in FIG. 21(a), the crystal axes of the birefringent elements 62, 63 can be set at 90 degrees and 0 degree, respectively, relative to the boundary between the birefringent element 62 and the birefringent element 63, and the crystal axes of the birefringent elements 64, 65 can set at +45 degrees and −45 degrees, respectively relative to the boundary between the birefringent element 64 and the birefringent element 65. As shown in FIG. 21(b) it is preferable to set the crystal axes of the birefringent elements 62, 63 at +22.5 degrees and −67.5 degrees, respectively, and to set the crystal axes of the birefringent elements 64, 65 at +67.5 degrees and −22.5 degrees, respectively, relative to the associated boundaries. This configuration raises productivity because the plate body consisting of the birefringent elements 62, 63 and the plate body consisting of the birefringent elements 64, 65 can have the same structure.

When the so-configured optical isolator element 60 is inserted in the groove 13 of the waveguide-embedded optical circuit 10 and a magnetic field is applied, then, as shown in FIG. 20 and FIGS. 21(a)–21(b), the upper half of the beam spot S of the light outputting the embedded optical waveguide 21 passes through the birefringent element 62 and the lower half thereof passes through the birefringent element 63. The light passing through the birefringent elements 62, 63 is rotated by 45 degrees by passing through the Faraday rotator 61 and then passes through the birefringent elements 64, 65. In this case, since the optical path length of the light passing through the birefringent elements 62, 64 and the optical path length of the light passing the birefringent elements 63, 65 are equal, the shape of the light passing through the optical isolator element 60 becomes the same as the shape of the light outputting the embedded optical waveguide 21. As a result, the light outputting the embedded optical waveguide 21 couples with the embedded optical waveguide 22. With respect to light outputting from the side of the embedded optical wave guide 21, on the other hand, the optical path length of the light passing through the birefringent elements 62, 64 is different from the optical path length of the light passing through the birefringent elements

63, 65. The light outputting the embedded optical waveguide 22 therefore does not couple with the embedded optical waveguide 21.

Therefore, when the optical isolator element 60 is inserted in the groove 13 instead of the optical isolator element 30, it becomes possible to use the waveguide-embedded optical circuit 10 as an arrayed optical isolator.

Figure 22:
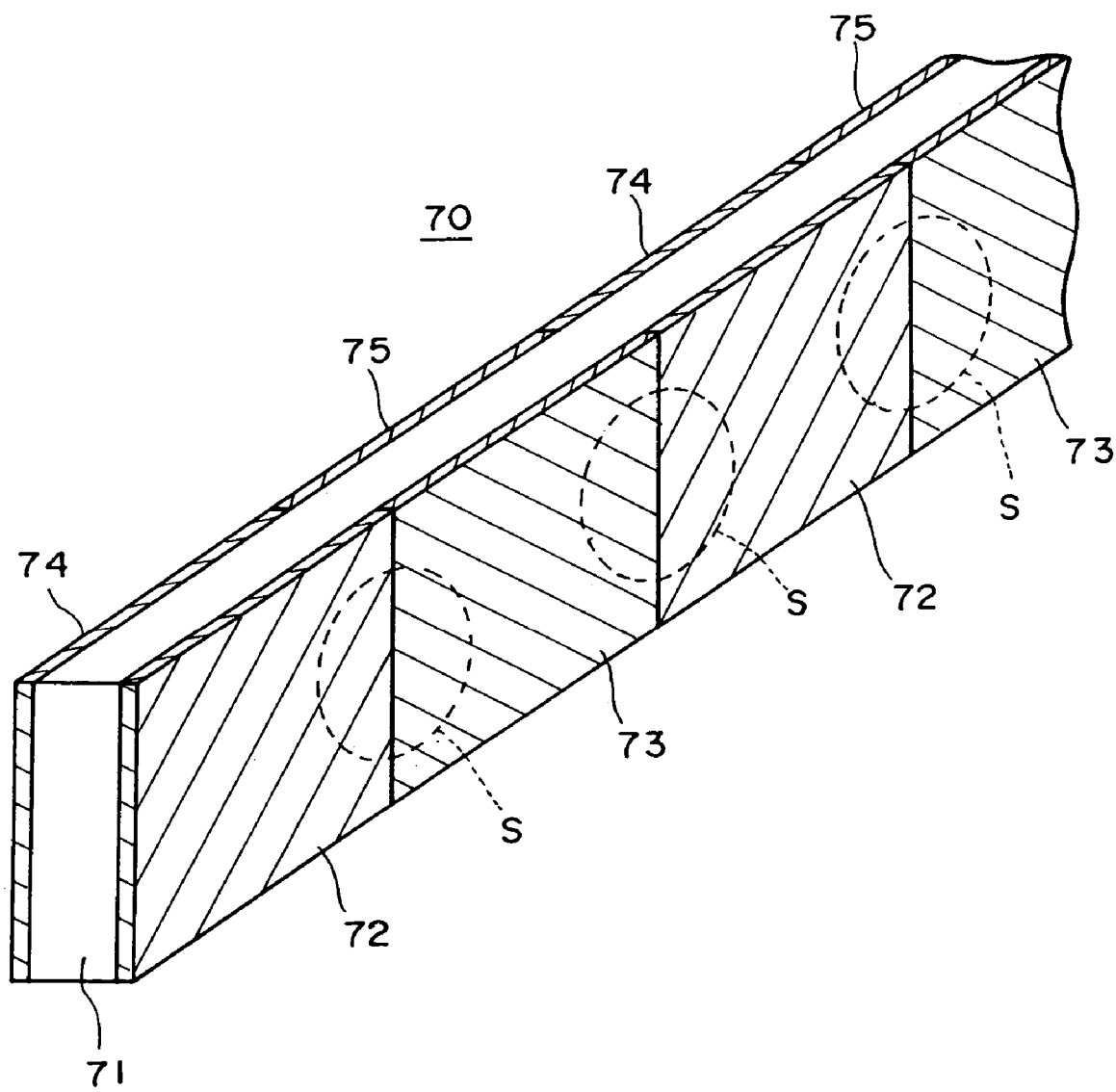
FIG. 22 is a schematic perspective view showing the structure of still another optical isolator element 70 which can be inserted in the groove 13.

FIG. 22 is a schematic perspective view showing the structure of still another optical isolator element 70 which can be inserted in the groove 13.

The optical isolator element 70 shown in FIG. 22 comprises a Faraday rotator 71 which rotates polarization by 45 degrees, birefringent elements 72, 73 formed on one surface of the Faraday rotator 71, and birefringent elements 74, 75 formed on the other (opposite) surface of the Faraday rotator 71. As shown in FIG. 22, the birefringent elements 72 and the birefringent elements 73 are arranged alternately on the one surface of the Faraday rotator 71. The birefringent elements 74 and the birefringent elements 75 are provided alternately on the other surface of the Faraday rotator 71 with the birefringent elements 74 facing the birefringent elements 72 and the birefringent elements 75 facing the birefringent elements 73.

The crystal axes of the birefringent elements 72 and the crystal axes of the birefringent elements 73 lie at right angles, and the crystal axes of the birefringent elements 74 and the crystal axes of the birefringent elements 75 lie at right angles. Furthermore, the crystal axes of the birefringent elements 72 and the crystal axes of the birefringent elements 74 make an angle of about 45 degrees, and the crystal axes of the birefringent elements 73 and the crystal axes of the birefringent elements 75 make an angle of about 45 degrees. Although, in this case, as shown in FIG. 23(*a*), the crystal axes of the birefringent elements 72, 73 can be set at 90 degrees and 0 degree, respectively, relative to the boundaries between the birefringent element 72 and the birefringent element 73, and the crystal axes of the birefringent elements 74, 75 can be set at +45 degrees and −45 degrees, respectively, relative to the boundaries between the birefringent elements 74 and the birefringent elements 75. As shown in FIG. 23(*b*) it is preferable to set the crystal axes of the birefringent elements 72, 73 at +22.5 degrees and −67.5 degrees, respectively, and to set the crystal axes of the birefringent elements 74, 75 at +67.5 degrees and −22.5 degrees, respectively, relative to the associated boundaries. This configuration raises productivity because the plate body consisting of the birefringent elements 72, 73, and the plate body consisting of the birefringent elements 74, 75 can have the same structure.

When the so-configured optical isolator element 70 is inserted in the groove 13 of the waveguide-embedded optical circuit 10 and a magnetic field is applied, then, as shown in FIG. 22 and FIGS. 23(*a*)–23(*b*), either the right half or the left half of the beam spot S of the light outputting the embedded optical waveguide 21 passes through the associated birefringent element 72 and the other half passes through the associated birefringent element 73. The light passing through the birefringent elements 72, 73 is rotated by 45 degrees by passing through the Faraday rotator 71 and then passes through the birefringent elements 74, 75. In this case, since the optical path length of light passing the birefringent elements 72, 74 and the optical path length of light passing the birefringent element 73, 75 are equal, the shape of the light passing through the optical isolator element 70 becomes the same as the shape of the light outputting the embedded optical waveguide 21. As a result, the light outputting the embedded optical waveguide 21 couples with the embedded optical waveguide 22. As regards the light outputting from the side of embedded waveguide 22, on the other hand, since the optical path length of the light passing through the birefringent elements 72, 74 is different from the optical path length of the light passing through the birefringent elements 73, 75. The light outputting the embedded optical waveguide 22 therefore does not couple with the embedded optical waveguide 21.

Therefore, when the optical isolator element 70 is inserted in the groove 13 in place of the optical isolator element 30, it becomes possible to use the waveguide-embedded optical circuit 10 as an arrayed optical isolator.

The optical isolator element 60 and optical isolator element 70 described above can be produced by the method explained below.

FIGS. 24(*a*)–24(*e*) are charts showing an example of the flow of processes for fabricating the optical isolator element 60 shown in FIGS. 20 and 21(*a*) and 21(*b*). First, at process 24(*a*), birefringent material wafers 69 (only one shown) are cut at regular intervals using a slicing machine or the like so as to obtain pieces whose cutting directions lie 0 degree, +45 degrees, −45 degrees and 90 degrees relative to the wafer crystal axis. At process 24(*b*), birefringent elements 64 and birefringent elements 65 (the crystal axis of the birefringent elements 64 is +45 degrees and the crystal axis of the birefringent elements 65 is −45 degrees) are adhered alternately with optical adhesives, and the birefringent elements 62 and birefringent elements 63 (the crystal axis of the birefringent element 62 is 0 degree and the crystal axis of the birefringent element 63 is 90 degrees) are adhered alternately with optical adhesives. In this case, pieces of the same kind can be used for the birefringent elements whose crystal axis is +45 degrees (birefringent elements 64) and the birefringent element whose crystal axis is −45 degrees (birefringent elements 65). Next, at process 24(*c*), the birefringent plate consisting of the birefringent elements 62 and birefringent elements 63 is adhered to one surface of a Faraday rotator wafer 61' and the birefringent plate consisting of the birefringent elements 64 and birefringent elements 65 is adhered to the other surface of Faraday rotator wafer 61'. In this case, the regions where the birefringent elements 62 and birefringent elements 63 are adhered have to match the regions where the birefringent elements 64 and birefringent element 65 are adhered, respectively. At process 24(*d*), the result is cut parallel to the original cutting direction to obtain multiple optical isolator elements 60, one of which is shown at 24(*e*).

Moreover, in fabricating the optical isolator element 60 shown in FIGS. 20 and 21(*b*), at the above-mentioned process 24(*a*), the birefringent wafers 69 can be cut at regular intervals using the slicing or the like so as to obtain pieces whose cutting directions lie +22.5 degree, +67.5 degrees, −67.5 degrees, and −22.5 degrees relative to the wafer crystal axis. A process 24(*b*), the birefringent elements 62 and birefringent element 63 (the crystal axis of the birefringent elements 62 is +22.5 degrees and the crystal axis of the birefringent elements 63 is −67.5 degrees) are adhered alternately with optical adhesives, and the birefringent elements 64 and birefringent elements 65 (the crystal axis of the birefringent elements 64 is +67.5 degrees and the crystal axis of the birefringent elements 65 is −22.5 degrees) are adhered alternately with optical adhesives. In this case, pieces of the same kind can be used for the birefringent elements whose crystal axis is +22.5 degrees (birefringent elements 62) and the birefringent elements whose crystal axis is −22.5 degrees (birefringent elements 65). Pieces of the same kind can also be used for the birefringent elements whose crystal axis is +67.5 degrees (birefringent elements 64) and the birefringent elements whose crystal axis is −67.5 degrees (birefringent elements 63).

Figure 23A:
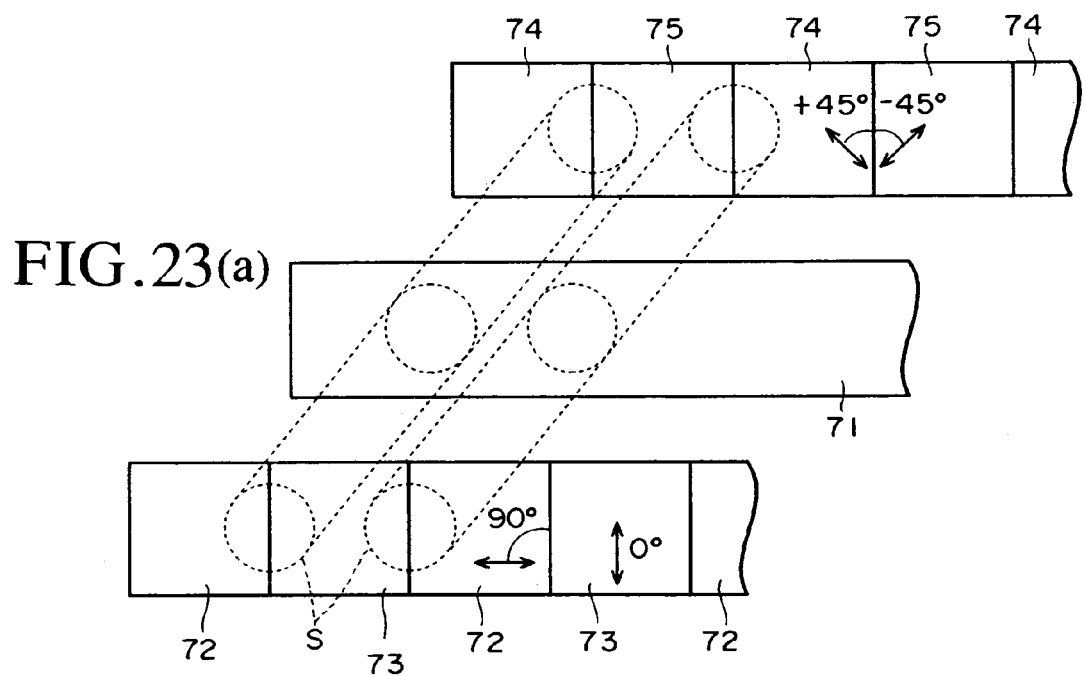
FIGS. 23(a)–23(b) show examples of the setting of the crystal axes of birefringent elements 72–75.
Figure 23B:
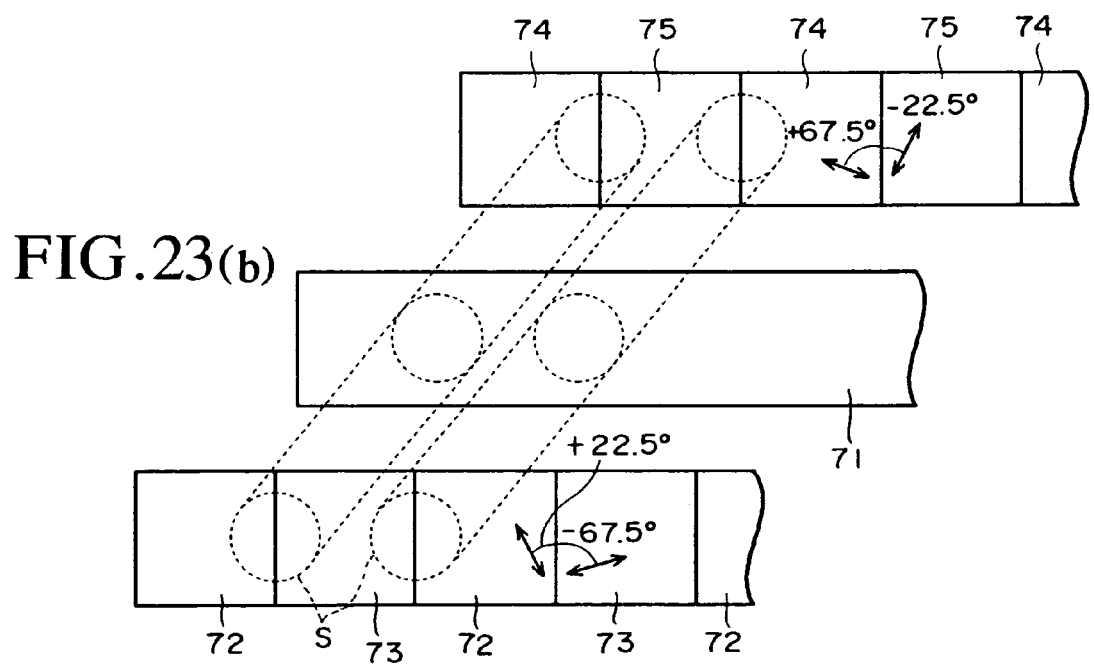

FIGS. 25(a)–25(e) are charts showing an example of the flow of process for fabricating the optical isolator element 70 shown in FIGS. 22 and 23(a) and 23(b). The processes 25(a)–25(c) are the same as those for fabricating the above-mentioned optical isolator element 60. First, birefringent wafers 79 (only one shown) are cut at regular intervals using a slicing machine or the like so as to obtain pieces whose cutting directions lie 0 degree, +45 degrees, −45 degrees, and 90 degrees relative to the wafer crystal axis. Next, the birefringent elements 74 and birefringent elements 75 (the crystal axis of the birefringent elements 74 is +45 degrees and the crystal axis of the birefringent elements 75 is −45 degrees) are adhered alternately with optical adhesives, and the birefringent elements 72 and birefringent elements 73 (the crystal axis of the birefringent elements 72 is 0 degree and the crystal axis of the birefringent elements 73 is 90 degrees) are adhered alternately with optical adhesives. In this case, pieces of the same kind can be used for the birefringent elements whose crystal axis is +45 degrees (birefringent elements 74) and the birefringent elements whose crystal axis is −45 degrees (birefringent elements 75). Next, the birefringent plate consisting of the birefringent elements 72 and the birefringent elements 73 is adhered to one surface of a Faraday rotator wafer 71' and the birefringent plate consisting of the birefringent elements 74 and the birefringent elements 75 is adhered to the other surface of Faraday rotator wafer 71'. In this case, of the regions where the birefringent elements 72 and birefringent elements 73 are adhered have to match the regions where the birefringent elements 74 and birefringent elements 75 are adhered, respectively. At process 25(d), the result is cut orthogonal to the original cutting direction obtain multiple optical isolator elements 70, one of which is shown at 25(e).

Moreover, in fabricating the optical isolator element 70 shown in FIGS. 22 and 23(b), at the above-mentioned process 25(a), the birefringent wafers 79 can be cut at regular intervals using the slicing machine or the like so as to obtain pieces whose cutting directions lie +22.5 degree, +67.5 degrees, −67.5 degrees, and −22.5 degrees relative to the wafer crystal axis. At process 25(b), the birefringent elements 72 and birefringent elements 73 (the crystal axis of the birefringent elements 72 is +22.5 degrees and the crystal axis of the birefringent elements 73 is −67.5 degrees) are adhered alternately with optical adhesives, and the birefringent elements 74 and birefringent elements 75 (the crystal axis of the birefringent elements 74 is +67.5 degrees and the crystal axis of the birefringent elements 75 is −22.5 degrees) are adhered alternately with optical adhesives. In this case, pieces of the same kind can be used for the birefringent elements whose crystal axis is +22.5 degrees (birefringent elements 72) and the birefringent elements whose crystal axis is −22.5 degrees (birefringent elements 75). Pieces of the same kind can also be used for the birefringent element elements whose crystal axis is +67.5 degrees (birefringent elements 74) and the birefringent elements whose crystal axis is −67.5 degrees (birefringent elements 73).

Figure 26:
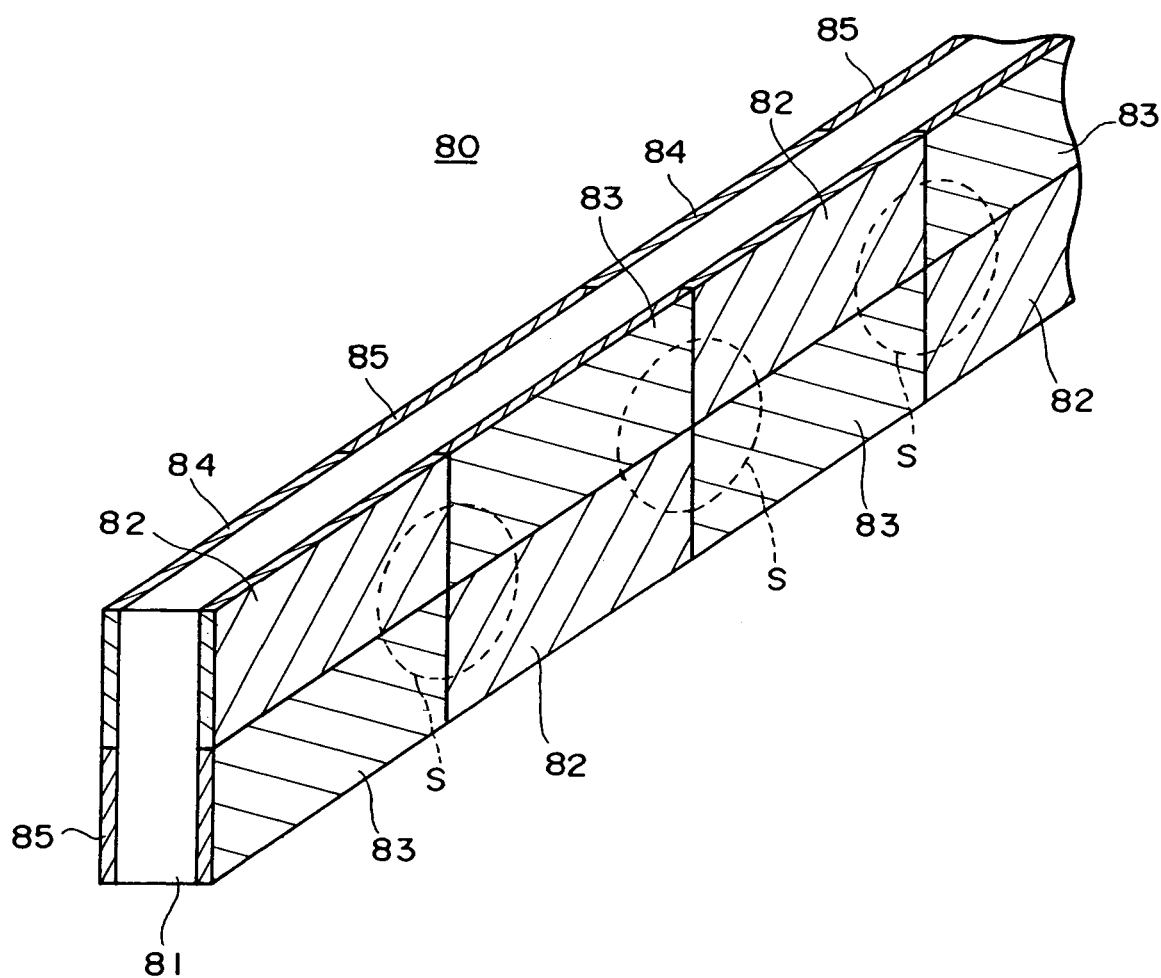
FIG. 26 is a schematic perspective view showing the structure of still another optical isolator element 80 which can be inserted in the groove 13.

Moreover, in addition to the optical isolator elements 30, 50, 60, and 70 described above, it is also possible to use the optical isolator element 80 shown in FIG. 26 as an optical isolator element to be inserted in the groove 13. The optical isolator element 80 shown in FIG. 26 comprises a Faraday rotator 81 for rotating polarization by 45 degrees, birefringent elements 82, 83 provided on one surface of the Faraday rotator 81 in a checker pattern and birefringent elements 84, 85 provided in a checker pattern on the other (opposite) surface of the Faraday rotator 81. An arrayed optical isolator can be obtained by inserting the optical isolator element 80 in the groove 13 so that the center of the beam spot S of the light outputting the embedded optical waveguide 21 is positioned at the center of the grid comprised of the birefringent elements 82, 83 and the grid comprised of the birefringent elements 84, 85

Although not shown, the crystal axes of the birefringent elements 82, 83 can be set at 90 degrees and 0 degree, respectively, relative to the vertical boundaries between the birefringent elements 82 and birefringent elements 83, and the crystal axes of the birefringent elements 84, 85 can be set as +45 degrees and −45 degrees, respectively, relative to the vertical boundaries between the birefringent elements 84 and birefringent elements 85. However, it is preferable to set the crystal axes of the birefringent elements 82, 83 at +22.5 degrees and −67.5 degrees, respectively, and to set the crystal axes of the birefringent elements 84, 85 at +67.5 degrees and −22.5 degrees, respectively, relative to the boundaries. This configuration raises productivity because the plate body consisting of the birefringent elements 82, 83, and the plate body consisting of the birefringent elements 84, 85 can have the same structure.

Although examples of configuring an arrayed optical isolator by inserting an optical isolator element (30, 50, 60, 70, or 80) in the groove 13 were described in the foregoing, it is also possible to configure an optical filter array by an inserting optical filter into the groove 13 instead of an optical isolator element. In this case, the same filtering characteristic can be imparted to every channel by inserting a large optical filter into the groove 13, or inserting several optical filters corresponding to one or more channels. Furthermore, by inserting an optical isolator element in a predetermined part of the groove 13 and inserting an optical filter in the other part of the groove 13, as the function of an optical isolator circuit can be obtained with respect to a certain channel or channels and as the function of an optical filter circuit can be obtained with respect to the remaining channel or channels.

Other preferred embodiments of the present invention will now be explained.

Figure 27:
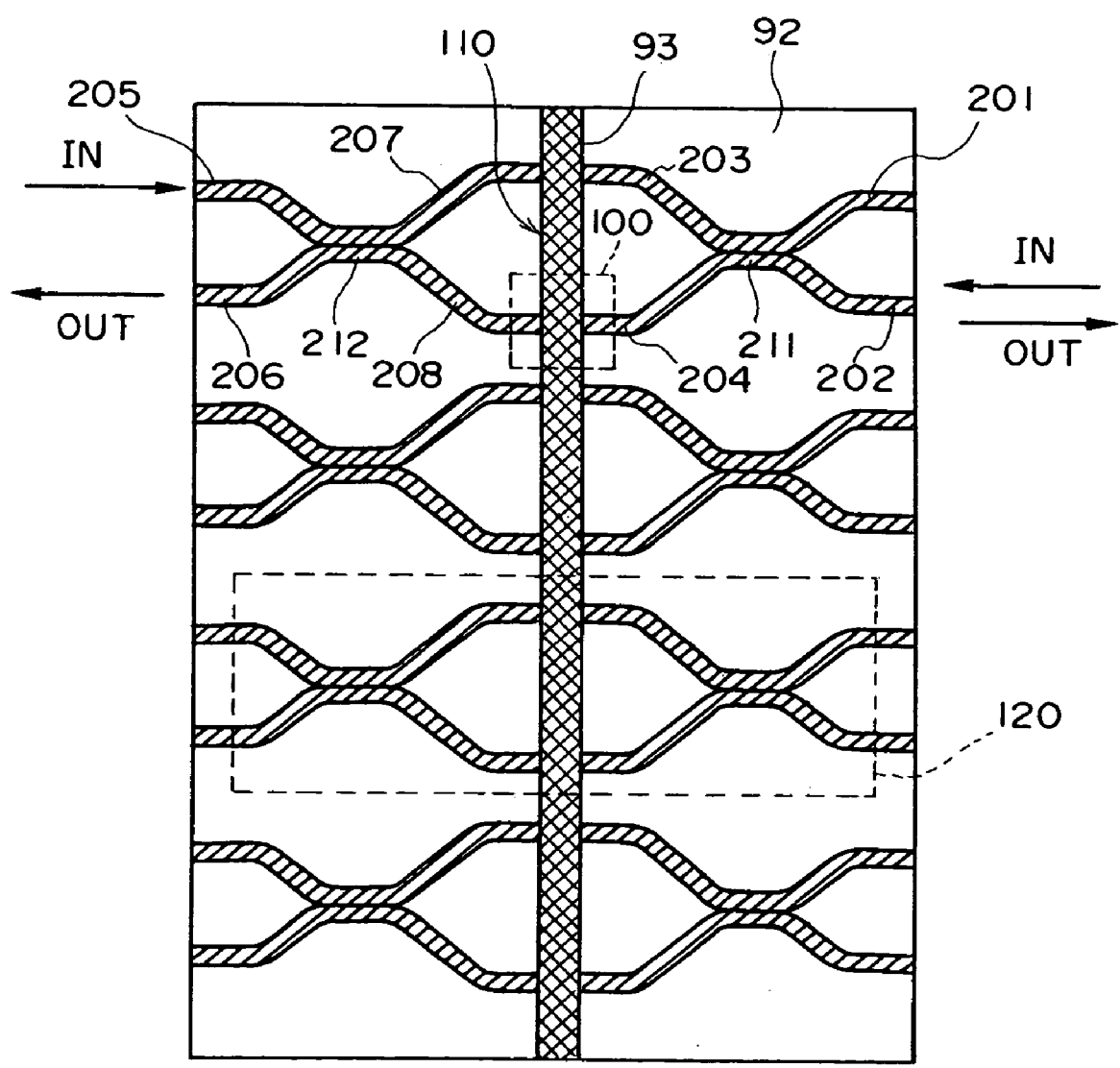
FIG. 27 is a schematic top view showing a waveguide-embedded optical circuit 90 (arrayed optical circulator) that is another preferred embodiment of the present invention.

FIG. 27 is a schematic top view showing a waveguide-embedded optical circuit 90 (arrayed optical circulator) that is another preferred embodiment of the present invention.

As shown in FIG. 27, the waveguide-embedded optical circuit 90 of this embodiment comprises a substrate (not shown), a waveguide layer 92 provided on the substrate and an optical isolator element 110 inserted in a groove 93 provided in the waveguide 12. The waveguide layer 92 is formed with multiple circulators 120 (four in the embodiment illustrated in FIG. 27) each comprising embedded optical waveguides 201–208. The groove 93 is inclined and serves to separate the embedded optical waveguides 203 from the embedded optical waveguides 207 and the embedded optical waveguides 204 from the embedded optical waveguides 208. The groove 93 is preferably given the narrowest width capable of accommodating the optical isolator element 110. Moreover, the optical isolator element 110 is fixed in the groove by optical adhesive (not shown) filled in the groove 93.

Each circulator 120 comprises optical coupler 211, 212. The embedded optical waveguides 201, 202 are located on one side of the optical coupler 211 and the embedded optical waves 203, 204 are located on the other side thereof The embedded optical waveguides 205, 206 are located on one side of the optical coupler 212 and the embedded optical waveguides 207, 208 are arranged on the other side thereof. Moreover, as shown in FIG. 27, the embedded optical waveguide 203 and the embedded optical waveguide 207 face each other across the groove 93, and the embedded optical waveguide 204 and the embedded optical waveguide 208 face each other across the groove 93.

When light inputting in the forward direction (rightward in FIG. 27) from the embedded optical waveguide 205 exits from the embedded optical waveguide 202, light inputting in the reverse direction (leftward in FIG. 27) from the embedded optical waveguide 202 exits from the embedded optical waveguide 206. Moreover, when light inputting in the forward direction (rightward in FIG. 27) from the embedded optical waveguide 205 exits from the embedded optical waveguide 201, light inputting in the reverse direction (leftward in FIG. 27) from the embedded optical waveguide 201 exits from the embedded optical waveguide 206.

Since the waveguide-embedded optical circuit 90 of this embodiment is equipped with an array of circulators 120, it can function as an optical circulator array when the optical isolator element 110 is inserted in the groove 93.

The structure of the region 100 where the embedded optical waveguide 204 (203) and the embedded optical waveguide 208 (207) face each other across the groove 93 is the same as that explained with reference to FIGS. 4–9, and, as such, comprises a pair of spot-size transformers. Therefore, as in the case of the waveguide-embedded optical circuit 10 (arrayed optical isolator) of the embodiment explained earlier, it is possible to significantly reduce the diffraction loss arising in the groove 93.

Figure 28:
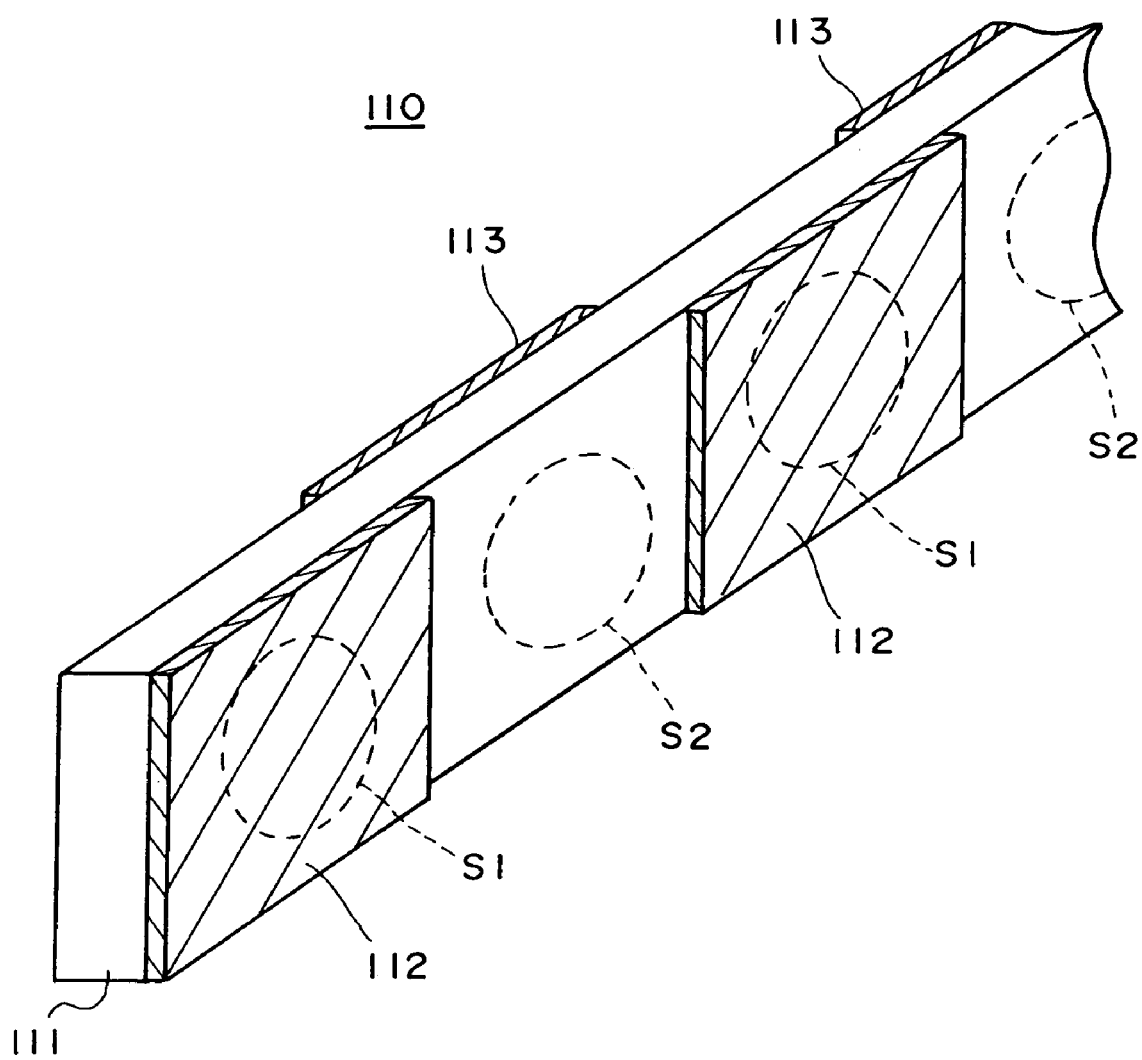
FIG. 28 is a schematic perspective view showing the structure of an optical isolator element 110.

FIG. 28 is a schematic perspective view showing the structure of the optical isolator element 110.

As shown in FIG. 28, the optical isolator element 110 comprises a Faraday rotator 111 which rotates polarization by 45 degrees, multiple birefringent elements 112 provided at regular intervals on one surface of the Faraday rotator 111, and multiple birefringent elements 113 provided at regular intervals on the other (opposite) surface of the Faraday rotator 111. As shown in FIG. 28, the birefringent elements 112 and the birefringent elements 113 are arranged alternately so as not to face each other. The crystal axis of the birefringent elements 112 and the crystal axis of the birefringent elements 113 make an angle of 45 degrees.

Although, in this case, the crystal axes of the birefringent elements 112, 113 are set at +45 degrees and 0 degree, respectively, relative to the boundaries between the regions where the birefringent element 113 and the birefringent elements 113 are provided, it is preferable to set the crystal axes of the birefringent element 112, 113 at +22.5 degrees and −67.5 degrees, respectively, relative to the boundaries. This configuration raises productivity because the birefringent elements 112, 113 can have the same structure.

The so-configured optical isolator element 110 is inserted in the groove 93 so that the beam spot S1 of the light outputting the embedded optical waveguide 204 (208) is positioned at the part where the birefringent element 112 is provided and the beam spot S2 of the light outputting the embedded optical waveguide 203 (207) is positioned at the part where the birefringent element 113 is provided.

Figure 29:
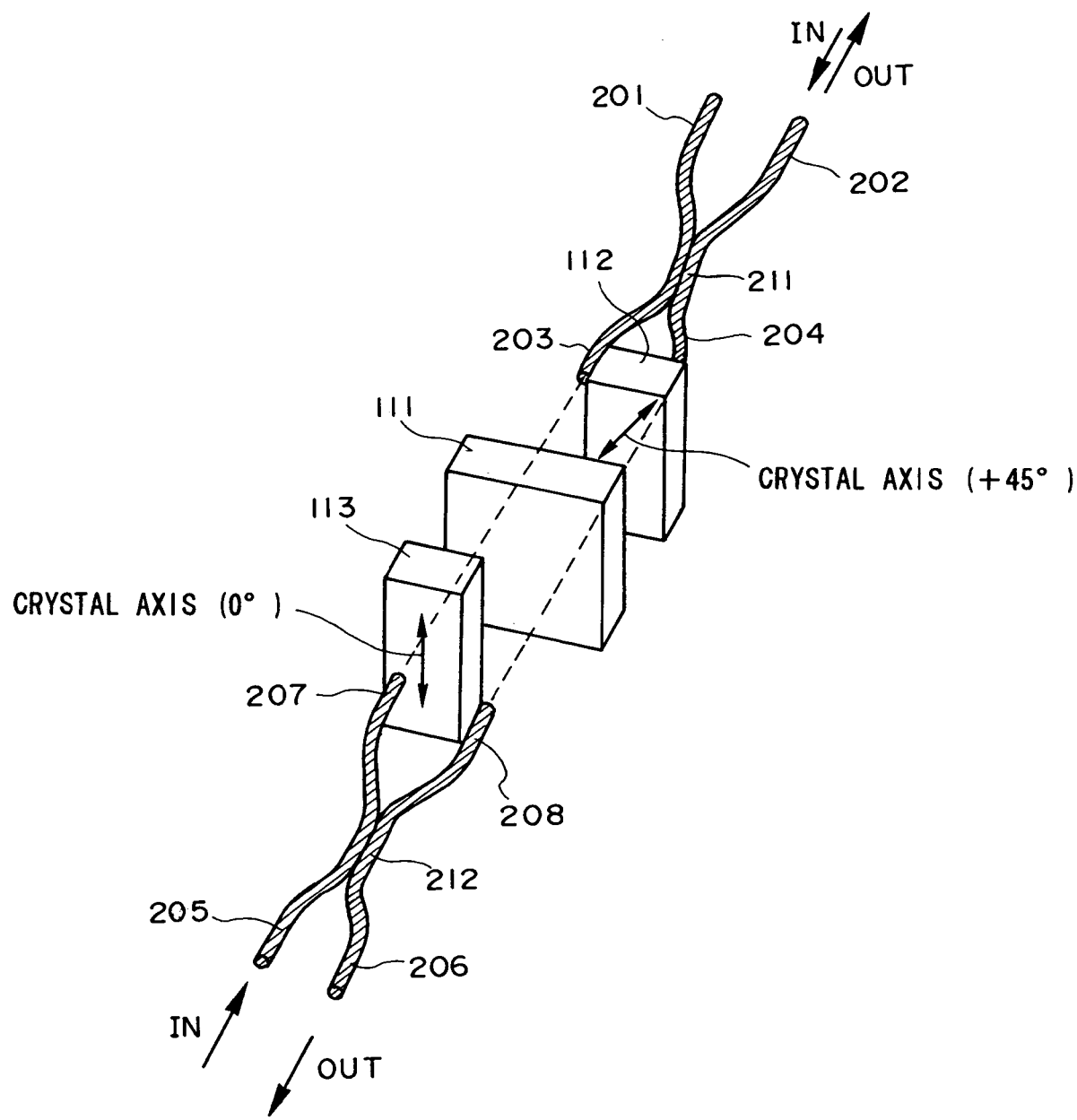
FIG. 29 is a schematic diagram for explaining the optical paths in each circulator 120 in the state where the optical isolator element 110 is inserted into a groove 93.

FIG. 29 is a schematic view for explaining the optical path in each circulator 120 in the state where the optical isolator element 110 is inserted in the groove 93. In FIG. 29, although the crystal axes of the birefringent elements 112, 113 are set at +45 degrees and 0 degree, respectively, if these crystal axes are set at +22.5 degrees and −67.5 degrees, respectively as above-mentioned, it becomes possible to fabricate the optical isolator element 110 using birefringent elements of the same kind.

As shown in FIG. 29, when the optical isolator element 110 is inserted in the groove 93, the Faraday rotator 111 and the birefringent element 112 are located in the optical path between the embedded optical waveguide 204 and the embedded optical waveguide 208, and the Faraday rotator 111 and the birefringent element 113 are located in the optical path between the embedded optical waveguide 203 and the embedded optical waveguide 207.

For this reason, light (reverse direction light) inputting to the embedded optical waveguide 202 separates in the optical coupler 211, propagates through the embedded optical waveguides 203, 204, passes through the optical isolator element 110 and undergoes interference in the same phase and is constructed in the optical coupler 211. On the other hand, light (forward direction light) inputting to the embedded optical waveguide 205 separates in the optical coupler 212, propagates through the embedded optical waveguide 207, 208, passes through the optical isolator element 110 and undergoes interference out of phase and is destructed in the optical coupler 211. Thus, the forward direction light inputting to the embedded optical waveguide 205 exits from the embedded optical waveguide 202 and the backward direction light inputting to the embedded optical waveguide 202 exits from the embedded optical waveguide 206. That is, a circulator function is obtained. Therefore, it becomes possible to use the waveguide-embedded optical circuit 90 of this embodiment as an optical circulator by inserting the optical isolator 110 in the groove 93.

Figure 30A:
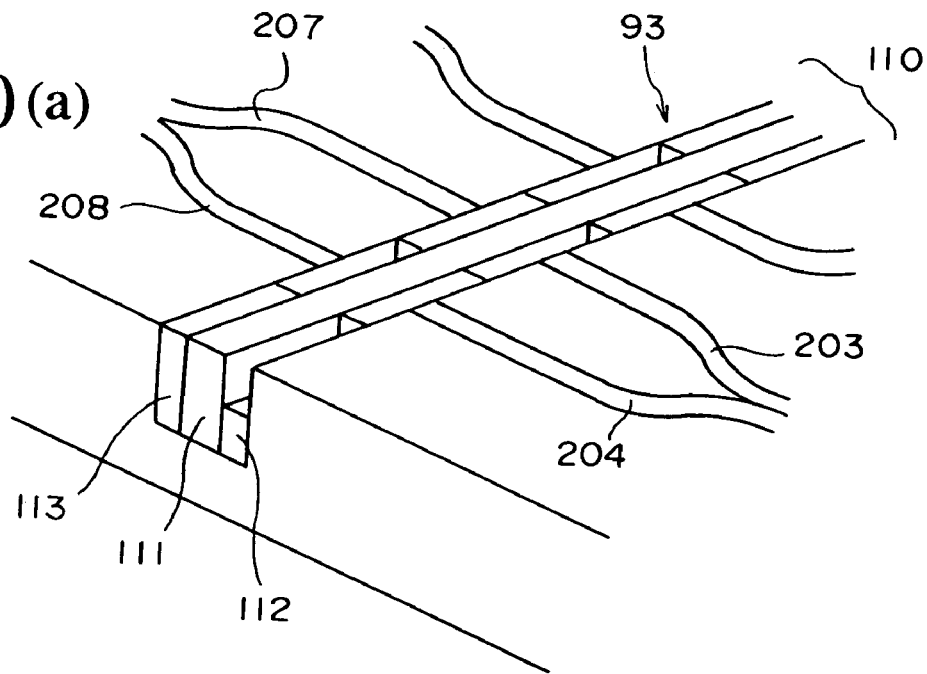
FIG. 30(a) is a schematic perspective view partially showing the state wherein a modified optical isolator element 110 is inserted into the groove 93.
Figure 30B:
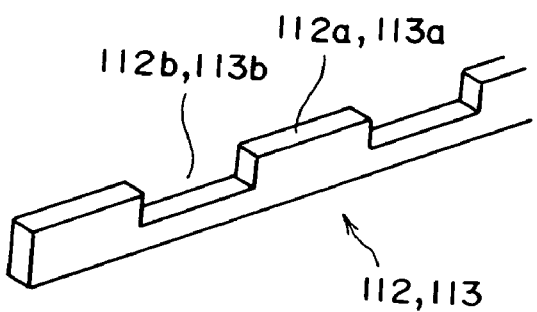
FIG. 30(b) is a schematic perspective view partially showing the structure of birefringent elements 112, 113 of the modified optical isolator element 110.

It should be noted that the structure is not limited to that of the optical isolator element 110 shown in FIG. 28 and, as shown in FIG. 30(a) and FIG. 30(b), it is also possible to adopt a structure wherein comb-shaped birefringent elements 112, 113 are adhered to opposite surfaces of Faraday rotator 111 so as to face each other. In this case, the comb-shaped birefringent elements 112, 113 are adhered so that the comb teeth 112a of the comb-shaped birefringent element 112 face the gaps 113b of the birefringent element 113 and the comb teeth 113a of the comb-shaped birefringent element 113 face the gaps 112b of the birefringent element 112. If the optical isolator element 110 is inserted in the groove 93 so that beam spot S1 is positioned at the comb teeth 112a of the birefringent element 112 and beam spot S2 is positioned at the comb teeth 113a of the birefringent element 113, the same function as that of the optical isolator element 110 shown in FIG. 28 can be realized. When the optical isolator element 110 is structured as illustrated in FIG. 30, the birefringent elements 112, 113 are identical components so that the process of adhering them to the Faraday rotator 111 is facilitated.

Figure 31:
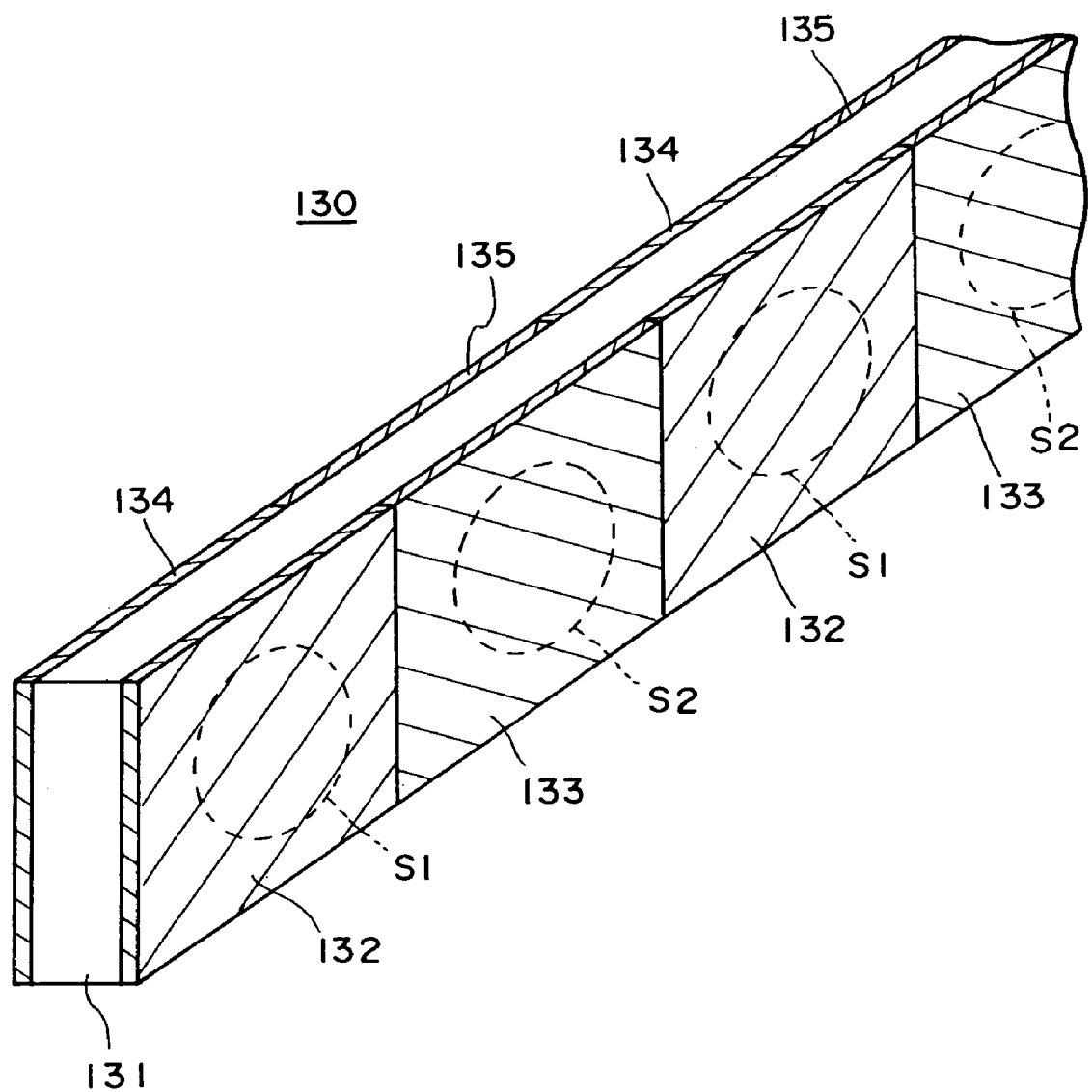
FIG. 31 is a schematic perspective view showing the structure of still another optical isolator element 130 which can be inserted in the groove 93.

FIG. 31 is a schematic perspective view showing the structure of still another optical isolator element 130 which can be inserted in the groove 93.

The optical isolator element 130 shown in FIG. 31 comprises a Faraday rotator 131 which rotates polarization by 45 degrees, birefringent elements 132, 133 provided on one surface of the Faraday rotator 131, and birefringent elements 134, 135 provided the other (opposite) surface of the Faraday rotator 131. As shown in FIG. 31, the birefringent elements 132 and the birefringent elements 133 are arranged alternately on the one surface of the Faraday rotator 131 and the birefringent elements 134 and the birefringent elements 135 are arranged alternately on the other surface of the Faraday rotator 131 in such manner that the birefringent elements 132 and birefringent element 134 face each other and the birefringent elements 133 and birefringent elements 135 face each other.

The crystal axes of the birefringent elements 132 and the crystal axes of the birefringent elements 133 lie at right angles, and the crystal axes of the birefringent elements 134 and the crystal axes of the birefringent elements 135 lie at right angles. Furthermore, the crystal axes of the birefringent elements 132 and the crystal axes of the birefringent elements 134 make an angle of about 45 degrees, and the crystal axes of the birefringent elements 133 and the crystal axes of the birefringent elements 135 make an angle of about 45 degrees.

Although, in this case, the crystal axes of the birefringent elements 132, 133 can be set at 90 degrees and 0 degree, respectively, relative to the boundaries between the birefringent elements 132, 133, and the crystal axes of the birefringent elements 134, 135 can be set at +45 degrees and −45 degrees, respectively, relatively to the boundaries between the birefringent elements 134 and the birefringent elements 135, it is preferable to set the crystal axes of the birefringent elements 132, 133 at +22.5 degrees and −67.5 degrees, respectively, and to set the crystal axes of the birefringent elements 134, 135 at +67.5 degrees and −22.5 degrees, respectively, relative to the associated boundaries. This configuration raises productivity because the plate body consisting of the birefringent elements 132, 133, and the plate body consisting of the birefringent elements 134, 135 can have the same structure.

The so-configured optical isolator element 130 is inserted in the groove 93 so that the beam spot S1 of the light outputting the embedded optical waveguide 204 (208) is positioned at the part where the birefringent element 132, 134 is provided and the beam spot S2 of the light outputting the embedded optical waveguide 203 (207) is positioned at the part where the birefringent element 133, 135 is provided.

Figure 32:
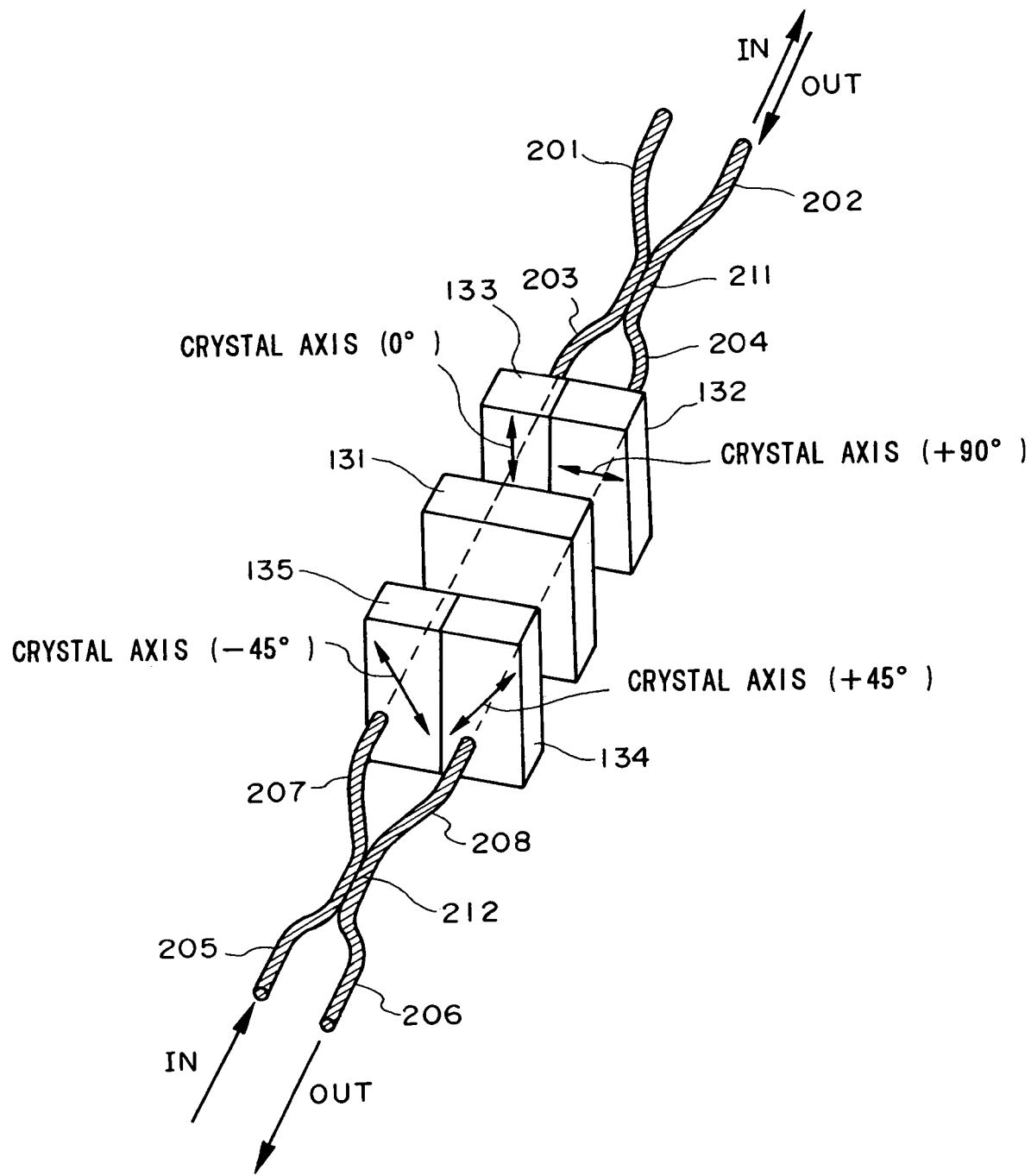
FIG. 32 is a schematic diagram for explaining the optical paths in each circulator 120 in the state where the optical isolator element 130 is inserted into the groove 93.

FIG. 32 is a schematic view for explaining the optical path in each circulator 120 in the state where the optical isolator element 130 is inserted in the groove 93. In FIG. 32, although the crystal axes of the birefringent elements 132, 133 are set at 90 degrees and 0 degree, respectively, and the crystal axis of the birefringent elements 134, 135 are set at +45 degrees and −45 degree, respectively, if these crystal axes are set at +22.5 degrees, −67.5 degrees, −22.5 degrees and +67.5 degrees, respectively as mentioned above, it becomes possible to raise productivity.

As shown in FIG. 32, when the optical isolator element 130 is inserted in the groove 93, the Faraday rotator 131 and the birefringent elements 132, 134 are located in the optical path between the embedded optical waveguide 204 and the embedded optical waveguide 208, and the Faraday rotator 131 and the birefringent elements 133, 135 are located in the optical path between the embedded optical waveguide 203 and the embedded optical waveguide 207.

For this reason, light (reverse direction light) inputting to the embedded optical waveguide 202 separates in the optical coupler 211, propagates through the embedded optical waveguides 203, 204, passes through the optical isolator element 130 and undergoes interference in the same phase and is constructed in the optical coupler 212. On the other hand, light (forward direction light) inputting to the embedded optical waveguide 205 separates in the optical coupler 212, propagates through the embedded optical waveguide 207, 208, passes through the optical isolator element 130 and undergoes interference out of phase and is destructed in the optical coupler 211. Thus, the forward direction light inputting to the embedded optical waveguide 205 outputs from the embedded optical waveguide 202 and the backward direction light inputting to the embedded optical waveguide 202 outputs from the embedded optical waveguide 206. That is, a circulator function is obtained. Therefore, it becomes possible to use the waveguide-embedded optical circuit 90 of this embodiment as an optical circulator by inserting the optical isolator 130 in the groove 93.

Figure 33A:
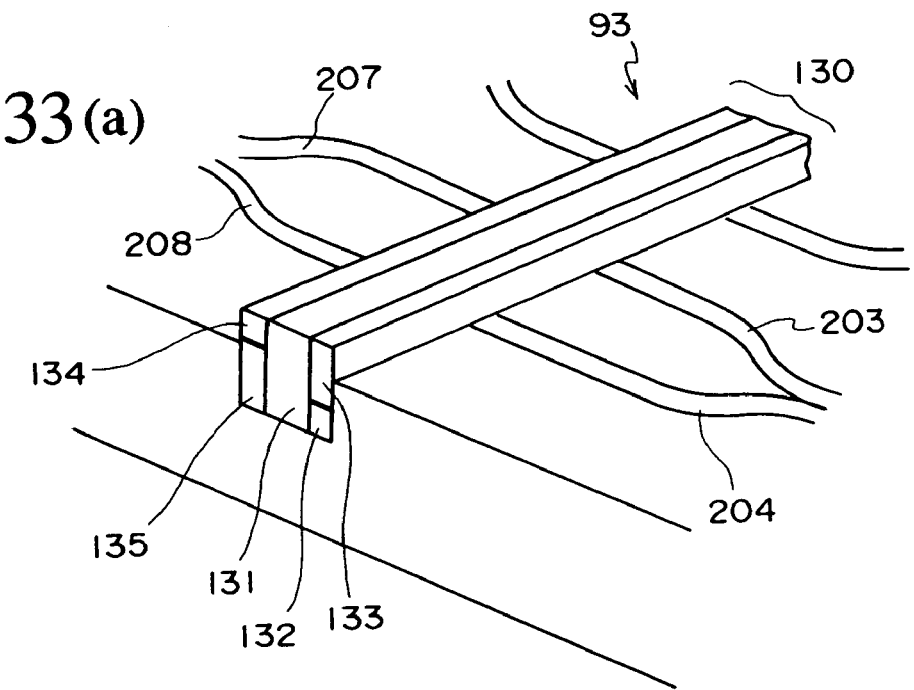
FIG. 33(a) is a schematic perspective view partially showing the wherein a modified optical isolator element 130 is inserted into the groove 93.
Figure 33B:
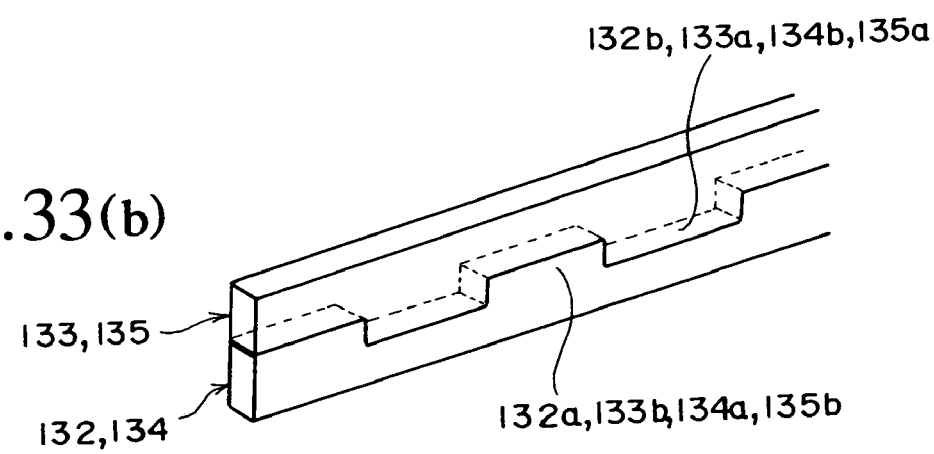
FIG. 33(b) is a schematic perspective view partially showing the structure of birefringent element 132–135 of the modified optical isolator element 130.

It should be noted that the structure is not limited to that of the optical isolator element 130 shown in FIG. 31 and, as shown in FIG. 33(*a*) and FIG. 33(*b*), it is also possible to adopt a structure wherein comb-shaped birefringent elements 132–135 are fabricated and adhered to opposite sides of the Faraday rotator 111 so that the teeth 132*a*, 133*a* of the birefringent elements 132, 133 fit into the gaps 132*b*, 133*b* of the birefringent elements 132, 133, thereby uniting the birefringent elements 132, 133, and so that the teeth 134*a*, 135*a* of the birefringent elements 134, 135 fit into the gaps 134*b*, 135*b* of the birefringent elements 134, 135, thereby uniting the birefringent elements 134, 135. In this case, the comb-shaped birefringent elements 132, 133 are adhered so that the teeth 132*a* of the birefringent element 132 face the teeth 134*a* of the birefringent element 134, and teeth 133*a* of the birefringent element 133 face the teeth 135*a* of the birefringent element 135. If the optical isolator element 130 is inserted in the groove 93 so that beam spot S1 is positioned at the comb teeth 132*a*, 134*a* of the birefringent element 132, 134 and beam spot S2 is positioned at the comb teeth 133*a*, 135*a* of the birefringent element 133, 135, the same function as that of the optical isolator element 130 shown in FIG. 33 can be realized. When the optical isolator element 130 is structured, as illustrated in FIG. 30, the birefringent elements 132, 133 are identical components so that the process of adhering them to the Faraday rotator 131 is facilitated.

Thus, in the waveguide-embedded optical circuit 90 of this embodiment, multiple optical circulators 120 are provided and the embedded optical waveguides 205–208 incorporating the optical circulators 120 include spot-size transformers. Owing to this configuration, the diffraction losses arising in the groove 93 can therefore be reduced significantly. It therefore becomes possible to reduce the diffraction loss occurring in each circulator 120 and exploit the advantage of the waveguide-embedded optical circuit being capable of miniaturization.

The present invention has thus been shown and described with reference to specific embodiments. However, it should be noted that the present invention is in no way limited to the details of the described arrangements but changes and modifications may be made without departing from the scope of the appended claims.

For example, it was explained in the foregoing that the optical resin layer 105 is provided in the region corresponding to the first optical waveguide of the waveguide-embedded optical circuit. However, since the optical resin layer 105 serves as the second optical waveguide (second cladding), it can be omitted in the part corresponding to the first optical waveguide. And it is not necessary to use the optical resin layer 105 as the second cladding insofar as the refractive index of the optical resin layer 105 is lower than the refractive index of the lower cladding layer 102 and the upper cladding layer 103 and other materials may be used.

In the above-described embodiments, the substrate 11 is formed using silica glass. However, the substrate 11 is not limited to silica glass insofar as a beam can be effectively confined in the lower cladding layer 102 and the substrate 11 may be formed of silicon that has a silica glass layer on its surface.

EXAMPLE 1

A spot-size transformer comprising the embedded optical waveguide 21 was fabricated, That is, a spot-size transformer was fabricated of only the substrate 11, the lower cladding layer 102-1, the upper cladding layer 103-1, the core region 104-1 and the optical resin layer 105-1.

A silica glass containing germanium was used as the material of the core region 104-1 (first core) and BPSG (silica glass doped with boron and phosphorus; n=1.4558) was used as the material of the lower cladding layer 102-1 and the upper cladding layer 103-1 (first cladding=second core) and an optical adhesive (n=1.4473) was used as the optical resin layer 105-1 (second cladding).

Furthermore, as regards the size of the core region 104-1 (first core), the length of the region corresponding to the first optical waveguide of the embedded optical waveguide 21 was set at 200 μm, the width and the height of the region was set at 7 μm, the length $x_2$ of the taper corresponding to the transition waveguide was set at 100 μm and the width $x_1$ of the end of the taper was set to 0.4 μm.

Furthermore, in the laminated body consisting of the lower cladding layer 102-1 and the upper cladding layer 103-1 (first core=second core), the length, the height, and the width of the laminated body were 2400 μm, 35 μm, 34 μm, respectively. The 200 μm section in which the height and the width of the core region 104-1 of the first core was set constant (the part corresponding to the first optical waveguide) served as the first cladding layer and the 1200 μm section where the core region 104-1 was not present served as the second core (the part corresponding to the second optical waveguide). And the 100 μm section in which the core region 104-1 was tapered (the part corresponding to the transition waveguide) gradually changed in function from that of the first cladding layer to that of the second core.

The spot-size of the beam was about 10 μm and the beam is input to the first optical waveguide of the above-mentioned embedded optical waveguide 21 of the spot-size transformer of such structure and optical field mode distribution of the beam outputting from the second optical waveguide was measured. It was found that the spot-size of the beam output from the second optical waveguide was about 28 μm, meaning that it had been enlarged 2.8 times.

EXAMPLE 2

An arrayed optical isolator was fabricated in the same manner as the waveguide-embedded optical circuit 10 shown in FIG. 2.

The spot-size transformers included in the arrayed optical isolator of Example 2 were of the same material and the same size as the one in accordance with Example 1. The groove separating the spot-size transformers was given a width of 600 μm and a formation angle θg of 5 degrees. Moreover, an optical isolator element was fabricated of a Faraday rotator formed to a thickness of 370 μm of bismuth-substituted rare-earth iron Garnett, whose rotation angle at the wavelength of 1.55 μm was 45 degrees, and two polarizers consisting of the wedge-shaped polarization glasses that were adhered to opposite sides of the Faraday rotator as shown in FIG. 18. The optical isolator element was inserted in the groove at an insertion angle θf of 0.6 degrees and applied with a magnetic field.

The extinction ratio and insertion loss were determined by causing light of a wavelength of 1.550 μm to propagate through one embedded optical waveguide and measuring the light intensity in the other embedded optical waveguide. The extinction ratio was found to be 29 dB and the insertion loss to be 1.0 dB In other words, very good characteristics were achieved.

EXAMPLE 3

The arrayed optical isolator was fabricated in which the width of the groove established in the arrayed optical isolator array of Example 2 was made 500 μm (formation angle θg=5 degrees). Moreover, an optical isolator element was fabricated of a Faraday rotator formed to a thickness of 370 μm of bismuth-substituted rare-earth iron Garnett, whose rotation angle at the wavelength of 1.55 μm was 45 degrees, and two birefringent elements consisting of x-cut quartz plates of a thickness of 46 μm that were adhered to opposite sides of the Faraday rotator as shown in FIG. 20. The optical isolator element was inserted in the groove at an insertion angle θf of 0.6 degrees and a magnetic field was applied.

The extinction ratio and insertion loss were determined by causing light of a wavelength of 1.550 μm to propagate through one embedded optical waveguide, and measuring the light intensity in the other embedded optical waveguide. The extinction ratio was found to be 26 dB and insertion loss to be 0.4 dB In other words, very good characteristics were achieved.

EXAMPLE 4

An arrayed optical isolator was fabricated in the same manner as the above-mentioned waveguide-embedded optical circuit 10.

The spot-size transformers included in the arrayed optical isolator of Example 4 were of the same material and the same size as the one in accordance with Example 1. Moreover, an optical isolator element was fabricated of a Faraday rotator formed to a thickness of 370 μm of bismuth-substituted rare-earth iron Garnett, whose rotation angle at the wavelength of 1.55 μm was 45 degrees, and two birefringent elements constituted as x-cut quartz plates of a thickness of 46 μm that were adhered to opposite sides of the Faraday rotator. The optical isolator element was inserted in the groove at an insertion angle θf of 0.6 degrees and applied with a magnetic field.

When the embedded optical waveguides 205, 206, 201, 202 shown in FIG. 27 were defined as Ports A, B, C, and D, respectively, the loss when A was made the input port and C the output port was 22.3 dB, the loss when A was made the input port and D the output port was 1.6 dB, the loss when D was made the input port and A the output port was 20.4 dB, and the loss when D was made the input port and B the output port was 1.8 dB Thus, very good characteristics were achieved.

For comparison, an arrayed optical circulator was fabricated without incorporating a spot-size transformer at the region 100 shown in FIG. 27 and with the height and width of the core regions fixed at 7 μm throughout the embedded optical waveguides 203, 204, 207, 208, The arrayed optical calculator was subjected to the same measurements as in Example 4. The loss when A was made the input port and D the output port was 8.9 dB, i.e., the insertion loss was large compared with that of the arrayed optical circulator of Example 4. It was thus confirmed that the diffraction loss of the spot-size transformer was reduced significantly in the optical circuit according to the invention.

The invention claimed is:

1. An optical functional element comprising:
    a magneto-optic functional element;
    first birefringent plates formed on one side of a surface of the magneto-optic functional element intersecting a light path for passing the light at predetermined intervals; and
    second birefringent plates formed on the other side of the surface of the magneto-optic functional element at predetermined intervals.

2. An optical functional element inserted into a groove of an arrayed waveguide-embedded optical circuit which comprises a waveguide, a groove formed across the waveguide and two or more embedded optical waveguide pairs whose members face each other across the groove, wherein the optical functional element comprises:
    a magneto-optic functional element;
    first and second birefringent plates being arranged on one surface of the magneto-optic functional element in a checker pattern;
    third and fourth birefringent plates being arranged on the other surface of the magneto-optic functional element in a checker pattern; and
    regions for passing the light propagating through the two or more pairs of the embedded optical waveguides.

3. An optical functional element inserted into a groove of an arrayed waveguide-embedded optical circuit which comprises a waveguide, a groove formed across the waveguide and two or more embedded optical waveguide pairs whose members face each other across the groove, wherein the optical functional element comprises:
    a magneto-optic functional element;
    first birefringent plates formed on one side of a surface of the magneto-optic functional element intersecting a light path for passing the light at predetermined intervals; and
    second birefringent plates formed on the other side of the surface of the magneto-optic functional element at predetermined intervals.

4. The optical functional element in accordance with claim 3 wherein the first and second birefringent plates are located at positions where they do not substantially face each other across the magneto-optic functional element.

* * * * *

UNITED STATES PATENT AND TRADEMARK OFFICE
CERTIFICATE OF CORRECTION

| | |
|---|---|
| PATENT NO. | : 7,068,864 B2 |
| APPLICATION NO. | : 10/702136 |
| DATED | : June 27, 2006 |
| INVENTOR(S) | : Naoki Hanashima et al. |

It is certified that error appears in the above-identified patent and that said Letters Patent is hereby corrected as shown below:

Title Page
Item (56) References Cited, U.S. Patent Documents, --5,151,955 09/1992 Ohta et al. 385/6-- should be inserted.

Signed and Sealed this

Twenty-first Day of August, 2007

JON W. DUDAS
*Director of the United States Patent and Trademark Office*